US012269045B2

(12) United States Patent
Fukuoka et al.

(10) Patent No.: US 12,269,045 B2
(45) Date of Patent: Apr. 8, 2025

(54) ELECTROSTATIC CHARGER AND ELECTROSTATIC PRECIPITATOR

(71) Applicant: SAMSUNG ELECTRONICS CO., LTD., Suwon-si (KR)

(72) Inventors: Daisuke Fukuoka, Yokohama (JP); Manabu Takezawa, Yokohama (JP); Seiro Yuge, Yokohama (JP)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 559 days.

(21) Appl. No.: 17/594,125

(22) PCT Filed: Mar. 30, 2020

(86) PCT No.: PCT/KR2020/004361
§ 371 (c)(1),
(2) Date: Oct. 4, 2021

(87) PCT Pub. No.: WO2020/204546
PCT Pub. Date: Oct. 8, 2020

(65) Prior Publication Data
US 2022/0161273 A1 May 26, 2022

(30) Foreign Application Priority Data

Apr. 2, 2019 (JP) ................................. 2019-070672
Mar. 26, 2020 (KR) ........................ 10-2020-0036648

(51) Int. Cl.
*B03C 3/41* (2006.01)
*B03C 3/08* (2006.01)
(Continued)

(52) U.S. Cl.
CPC .................. *B03C 3/41* (2013.01); *B03C 3/08* (2013.01); *B03C 3/12* (2013.01); *B03C 3/38* (2013.01);
(Continued)

(58) Field of Classification Search
CPC .... B03C 3/02; B03C 3/08; B03C 3/12; B03C 3/32; B03C 3/38; B03C 3/368;
(Continued)

(56) References Cited

U.S. PATENT DOCUMENTS 2,467,068 A * 4/1949 Wintermute .............. B03C 3/66 96/79
3,026,964 A * 3/1962 Penney ..................... B03C 3/12 96/76

(Continued)

FOREIGN PATENT DOCUMENTS

EP 2 316 575 A 5/2011
JP 08112549 * 6/1994

(Continued)

OTHER PUBLICATIONS

International Search Report in International Patent Application No. PCT/KR2020/004361 dated Jul. 28, 2020.

(Continued)

*Primary Examiner* — Christopher P Jones
*Assistant Examiner* — Sonji Turner
(74) *Attorney, Agent, or Firm* — STAAS & HALSEY LLP

(57) ABSTRACT

The present disclosure relates to an electrostatic charger and an electrostatic precipitator securing a wide space for charging suspended fine particles contained in a processing airflow. The electrostatic charger includes a discharge electrode formed of a plurality of fibrous conductors and provided to generate and diffuse ions by a discharge, a ground electrode maintained at a ground potential and provided to attract the ions generated and diffused by the discharge electrode to charge suspended fine particles contained in a processing airflow by the ions, where the discharge electrode is disposed between the ground electrodes in the processing
(Continued)

airflow, and all or at least a part of the plurality of fibrous conductors of the discharge electrode are disposed on a downstream side of the processing airflow further than an end portion of the ground electrode on the most upstream side of the processing airflow.

19 Claims, 26 Drawing Sheets

(51) Int. Cl.
*B03C 3/12* (2006.01)
*B03C 3/38* (2006.01)
*B03C 3/47* (2006.01)

(52) U.S. Cl.
CPC ............ *B03C 3/47* (2013.01); *B03C 2201/04* (2013.01); *B03C 2201/10* (2013.01)

(58) Field of Classification Search
CPC .... B03C 3/40; B03C 3/41; B03C 3/45; B03C 3/47; B03C 3/60; B03C 3/66; B03C 2201/04; B03C 2201/10
See application file for complete search history.

(56) References Cited

U.S. PATENT DOCUMENTS

| | | | | | |
|---|---|---|---|---|---|
| 3,511,030 | A * | 5/1970 | Brown | B03C 3/66 96/25 |
| 3,958,962 | A * | 5/1976 | Hayashi | B03C 3/41 96/97 |
| 4,056,372 | A * | 11/1977 | Hayashi | B03C 3/41 96/87 |
| 5,055,118 | A * | 10/1991 | Nagoshi | B03C 3/60 96/99 |
| 5,466,279 | A * | 11/1995 | Hattori | B03C 3/47 96/100 |
| 5,707,428 | A * | 1/1998 | Feldman | B03C 3/06 96/60 |
| 6,749,669 | B1 * | 6/2004 | Griffiths | B03C 3/28 96/99 |
| 7,655,076 | B2 * | 2/2010 | Griffiths | B03C 3/011 96/64 |
| 7,942,952 | B2 * | 5/2011 | Gale | B03C 3/08 96/97 |
| 8,454,733 | B2 * | 6/2013 | Tanaka | B03C 3/383 96/97 |
| 8,597,415 | B2 * | 12/2013 | Noh | B03C 3/12 96/60 |
| 9,308,538 | B2 * | 4/2016 | Genereux | B01D 53/323 |
| 9,764,334 | B2 * | 9/2017 | Kim | B03C 3/88 |
| 10,179,336 | B2 * | 1/2019 | Genereux | B01D 53/323 |
| 10,766,039 | B2 * | 9/2020 | Yuge | B03C 3/47 |
| 11,413,626 | B2 * | 8/2022 | Kochiyama | F24F 8/30 |
| 11,541,343 | B2 * | 1/2023 | Shin | B03C 3/38 |
| 2003/0005824 | A1 * | 1/2003 | Katou | B03C 3/12 96/35 |
| 2007/0240575 | A1 * | 10/2007 | Kiern | B03C 3/41 96/96 |
| 2011/0094383 | A1 * | 4/2011 | Noh | B03C 3/47 96/17 |
| 2016/0243559 | A1 | 8/2016 | Kim et al. | |
| 2018/0169666 | A1 * | 6/2018 | Loreth | F24F 8/10 |

FOREIGN PATENT DOCUMENTS

| | | | | |
|---|---|---|---|---|
| JP | 8-112549 | A | | 5/1996 |
| JP | 2015-136683 | A | | 7/2015 |
| JP | 2016-073954 | A | | 5/2016 |
| JP | 2019021509 | | * | 2/2019 |
| KR | 20-0295210 | Y1 | | 11/2002 |
| KR | 10-0905722 | B1 | | 7/2009 |
| KR | 10-2011-0045851 | A | | 5/2011 |
| KR | 10-2014-0017621 | A | | 2/2014 |
| KR | 10-1647719 | B1 | | 8/2016 |
| KR | 10-2019-0098616 | A | | 8/2019 |

OTHER PUBLICATIONS

Office Action dated Oct. 19, 2023 in European Patent Application No. 20 783 908.5.
European Search Report for European Application No. 20783908.5 dated Mar. 30, 2022.
European Office Action dated May 16, 2024 for European Application No. 20783908.5.

* cited by examiner

FIG. 17

| | EMBODIMENT 1 | EMBODIMENT 2 | EMBODIMENT 3 |
|---|---|---|---|
| DISCHARGE ELECTRODE INSTALLATION DIRECTION | WIND UPSTREAM DIRECTION (SIX) | | |
| GROUND ELECTRODE | CONDUCTIVE MEMBER PARALLEL ARRANGEMENT (L1=10mm) | CONDUCTIVE MEMBER ORTHOGONAL ARRANGEMENT (L2=10mm) | CONDUCTIVE MEMBER PARALLEL/ ORTHOGONAL COMBINATION T-SHAPE ARRANGEMENT (L1 / L2 = 10mm/10mm) |
| CHARGING UNIT CONFIGURATION | 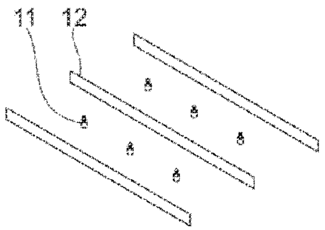  | 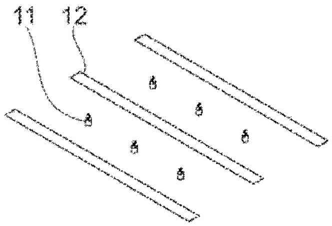  | 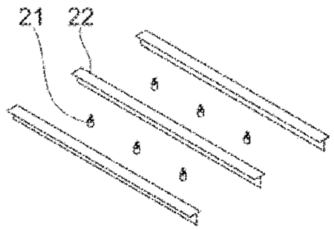  |
| DISCHARGE GAP | 60mm | | |
| DISCHARGE VOLTAGE | CHARGING UNIT:10kV, DUST COLLECTING UNIT: 6kV | | |
| DUST COLLECTION EFFICIENCY | 92% | 90% | 93% |
| OZONE GENERATION AMOUNT | <1.5ppb | <1.5ppb | <1.5ppb |
| CHARGE-UP RATE | 1.0 | 0.75 | 0.57 |

FIG. 18

| | EMBODIMENT 4 | EMBODIMENT 5 | EMBODIMENT 6 |
|---|---|---|---|
| DISCHARGE ELECTRODE INSTALLATION DIRECTION | TRANSVERSE DIRECTION (SIX) | | |
| GROUND ELECTRODE | CONDUCTIVE MEMBER PARALLEL ARRANGEMENT (L1=10mm) | CONDUCTIVE MEMBER ORTHOGONAL ARRANGEMENT (L2=10mm) | CONDUCTIVE MEMBER PARALLEL/ ORTHOGONAL COMBINATION T-SHAPE ARRANGEMENT (L1 / L2 = 10mm/10mm) |
| CHARGING UNIT CONFIGURATION | 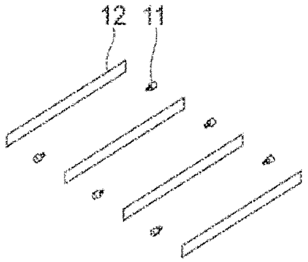  | 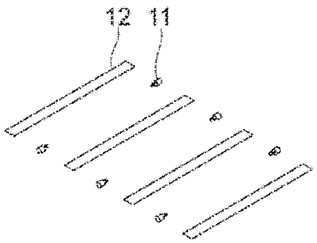  | 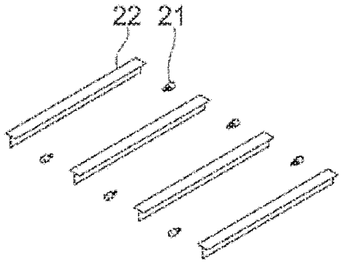  |
| DISCHARGE GAP | 60mm | | |
| DISCHARGE VOLTAGE | CHARGING UNIT:10kV, DUST COLLECTING UNIT: 6kV | | |
| DUST COLLECTION EFFICIENCY | 90% | 90% | 95% |
| OZONE GENERATION AMOUNT | <1.5ppb | <1.5ppb | <1.5ppb |
| CHARGE-UP RATE | 1.0 | 0.66 | 0.57 |

ELECTROSTATIC CHARGER AND ELECTROSTATIC PRECIPITATOR

CROSS-REFERENCE TO RELATED APPLICATIONS

This application is a U.S. National Stage Application, which claims the benefit under 35 U.S.C. § 371 of International Patent Application No. PCT/KR2020/004361, filed on Mar. 30, 2020, which claims the priority benefit of Japanese Patent Application 2019-070672, filed Apr. 2, 2019 in the Japanese Patent and Trademark Office and Korean Patent Application No. 10-2020-0036648, filed on Mar. 26, 2020 in the Korean Patent and Trademark Office, the disclosures of which are hereby incorporated by reference in their entirety.

BACKGROUND

Field

The present disclosure relates to an electrostatic charger and an electrostatic precipitator.

Description of the Related Art

A corona discharge unit is known in which a high voltage side output terminal of a high voltage power supply for corona discharge is connected to a corona discharge electrode through a conducting wire and an insulator (or an insulation pipe), a ground-side output terminal is connected to a counter electrode through a conducting wire or is also grounded, the counter electrode forms a gas duct having a rectangular cross section together with a top plate and a bottom plate on a plate-shaped electrode provided parallel to a gas flow or parallel to each other, the corona discharge electrode is disposed to be vertically insulated along a central axis from the center of a distance of the counter electrodes adjacent to each other, an upper portion of the corona discharge electrode is fixedly supported on the insulation pipe penetrating the top plate and a lower portion of the corona discharge electrode is fixedly supported on the insulator provided on the bottom plate, and a metal mesh-shaped protector installed on upstream and downstream sides of the gas duct is grounded together with a counter electrode group and also serves as an auxiliary counter electrode.

In a case of adopting a configuration in which the discharge electrode is disposed on an upstream side of a processing airflow further than an end portion of a ground electrode on the most upstream side of the processing airflow, because the ground electrode may not attract the ions generated and diffused by the discharge electrode in a direction of intersecting the process airflow, a wide space for charging suspended fine particles contained in the processing air may not be secured.

In addition, in a case of adopting a configuration in which a ground electrode having a flat plate shape is disposed in a direction toward a processing airflow as a ground electrode to attract the ions generated and diffused by the discharge electrode, because it is necessary to secure a wide space for diffusing ions, a device for charging suspended fine particles contained in the processing airflow may not become compact.

SUMMARY

An aspect of the present disclosure provides an electrostatic precipitator including a charging unit including a discharge electrode including a plurality of electrically conductive fibers and provided to generate and diffuse ions by a discharge, and a ground electrode to be maintained at a ground potential and provided to attract the ions generated and diffused by the discharge electrode to charge suspended fine particles contained in a processing airflow by the ions, wherein the ground electrode is among a plurality of ground electrodes and the discharge electrode is disposed between the plurality of ground electrodes in the processing airflow, and the plurality of electrically conductive fibers of the discharge electrode is disposed along a downstream side of the processing airflow further than an end portion of the ground electrode along an upstream side of the processing airflow, and a dust collecting unit provided to collect dust by adhering the suspended fine particles charged by the charging unit.

The plurality of electrically conductive fibers of the discharge electrode may be formed to generate ions toward the upstream side of the processing airflow.

The ground electrode may be disposed at a position to attract the ions generated and diffused by the discharge electrode along a direction of crossing the processing airflow.

The discharge electrode may be installed at a center between two of the adjacent ground electrodes among the plurality of ground electrodes and disposed such that a separation distance from the ground electrode along a direction of being orthogonal to the processing airflow is 20 mm or more and 100 mm or less.

The ground electrode may be formed of a plate-shaped electrically conductive member.

The ground electrode may be disposed such that an arrangement direction of the ground electrode with respect to the discharge electrode is orthogonal to the processing airflow and the plate-shaped electrically conductive member is parallel to the processing airflow.

The ground electrode may be disposed such that an arrangement direction of the ground electrode with respect to the discharge electrode is orthogonal to the processing airflow and the plate-shaped electrically conductive member crosses the processing airflow.

The ground electrode may include a first electrode part of a plate shape disposed along a direction of being parallel to the processing airflow, and a second electrode part of a plate shape disposed along a direction of crossing the processing airflow.

An end portion of the first electrode located on the upstream side of the processing airflow and a central portion of the second electrode may be joined such that the first electrode part and the second electrode part of the ground electrode form a T-shape.

When a length of the first electrode part of the ground electrode along the direction of being parallel to the processing airflow is denoted by L1 and a length of the second electrode part along the direction of crossing the processing airflow is denoted by L2, a ratio L2/L1 may be set to a value satisfying $0.4 \leq L2/L1 \leq 2$.

The discharge electrode may be disposed on the downstream side of the processing airflow further than an end portion of the first electrode part located on the upstream side of the processing airflow.

The electrostatic precipitator may further include a high voltage power supply provided to apply a high voltage between the discharge electrode and the ground electrode, wherein the high voltage power supply applies a DC high voltage having a positive polarity or a negative polarity between the discharge electrode and the ground electrode.

The electrostatic precipitator may further include a high voltage power supply provided to apply a high voltage between the discharge electrode and the ground electrode, wherein the high voltage power supply applies an AC high voltage having a positive polarity or a negative polarity between the discharge electrode and the ground electrode.

The dust collecting unit may include a first plate-shaped dust collecting electrode in which a surface thereof is coated with a film of an insulating material and a second plate-shaped dust collecting electrode having an electrical conductivity, where the first dust collecting electrode and the second dust collecting electrode may be alternately stacked.

Another aspect of the present disclosure provides an electrostatic charger including a discharge electrode including a plurality of electrically conductive fibers and provided to generate and diffuse ions by a discharge, and a ground electrode formed of a plate-shaped electrically conductive member, the ground electrode being maintained at a ground potential and provided to attract the ions generated and diffused by the discharge electrode to charge suspended fine particles contained in a processing airflow by the ions, wherein the ground electrode is among a plurality of ground electrodes and the discharge electrode is disposed between the plurality of ground electrodes in the processing airflow, and the plurality of electrically conductive fibers of the discharge electrode is disposed along a downstream side of the processing airflow further than an end portion of the ground electrode along an upstream side of the processing airflow, wherein the ground electrode includes a first electrode part of a plate shape disposed along a direction of being parallel to the processing airflow and a second electrode part of a plate shape disposed along a direction of crossing the processing airflow, and wherein an end portion of the first electrode located on the upstream side of the processing airflow and a central portion of the second electrode are joined such that the first electrode part and the second electrode part of the ground electrode form a T-shape.

BRIEF DESCRIPTION OF DRAWINGS

The above and/or other aspects of the disclosure will be more apparent by describing various embodiments of the disclosure with reference to the accompanying drawings, in which:

FIG. 17 is a diagram illustrating effects of embodiments described herein.

FIG. 18 is a diagram illustrating effects of embodiments described herein.

DETAILED DESCRIPTION

Figure 1:
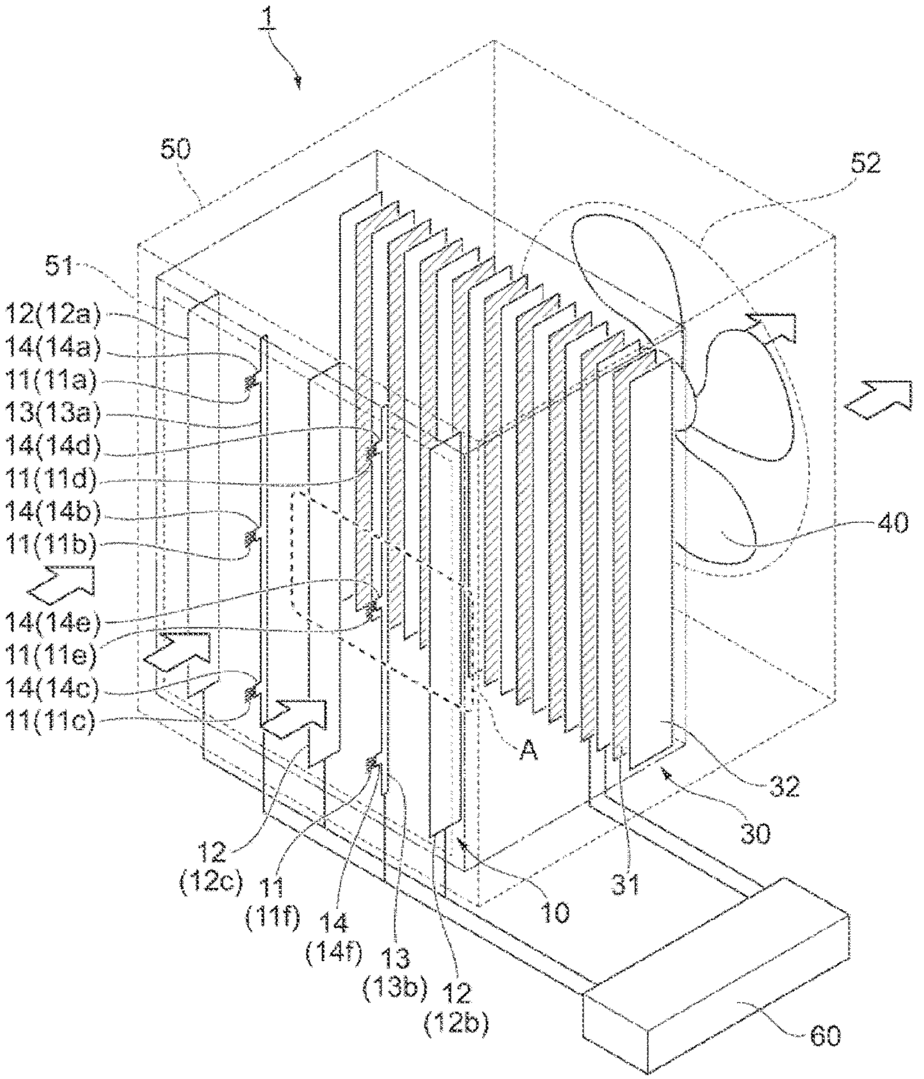
FIG. 1 is a perspective view illustrating an overall configuration of an electrostatic precipitator according to an embodiment of the present disclosure.

Hereinafter, embodiments of the present disclosure will be described in detail with reference to the accompanying drawings.

A purpose of the present disclosure is to secure a wide space for charging suspended particles contained in a processing airflow, compared to a case in which a discharge electrode is configured to be disposed on an upstream side of the processing airflow further than an end portion of the ground electrode on the most upstream side of the processing airflow.

Another purpose of the present disclosure is to make a device for charging suspended particulates contained in a processing airflow compact, compared to a case in which a ground electrode having a flat plate shape is configured to be disposed in a direction toward the processing airflow as a ground electrode to attract the ions generated and diffused by the discharge electrode.

As noted above, according to the present disclosure, a wide space for charging suspended particles contained in a processing airflow can be secured, compared to a case in which a discharge electrode is configured to be disposed on an upstream side of the processing airflow further than an end portion of the ground electrode on the most upstream side of the processing airflow.

Further, according to the present disclosure, a device for charging suspended particulates contained in a processing airflow can become compact, compared to a case in which a ground electrode having a flat plate shape is configured to be disposed in a direction toward the processing airflow as a ground electrode to attract the ions generated and diffused by the discharge electrode.

An electrostatic precipitator for charging and collecting suspended fine particles by using a discharge may be provided in an electric product such as an air purifier and an air conditioner. The electrostatic precipitator includes a charging unit provided to charge suspended fine particles by the discharge, and a dust collecting unit provided to collect the charged suspended fine particles. The charging unit generates a discharge by applying a high voltage of several kV between a high voltage electrode (discharge electrode) and an opposing ground electrode, and charges the suspended fine particles using ions generated by the discharge.

In the charging unit in which the discharge electrode is formed in a wire shape or a needle shape, it is necessary to increase a discharge current to obtain a high dust collection efficiency, and an amount of ozone (O3) generated together with the discharge increases. Because ozone has a unique irritating odor, when ozone is released into the room, an ozone concentration needs to be below the environmental standard (50 ppb). In addition, when the discharge electrode is formed in a wire shape, the electrode becomes contaminated while the operation is continued, which may cause the wire to vibrate, resulting in the generation of unpleasant noise or spark abnormality.

There is also a charging unit in which the discharge electrode is composed of a fiber-shaped conductor, and in this case, an ozone generation amount is suppressed to a low level, but the discharge itself is easily affected by the conditions around the charging unit, so that the performance may not be stable. In addition, because a charging method centered on diffusion charging is used in such the charging unit, it is necessary to secure a wide diffusion space, making it difficult to compact the charging unit.

Therefore, the present embodiment provides an electrostatic charger using a fibrous conductor as a discharge electrode that may obtain the high dust collection efficiency and solve problems such as ozone generation, wire vibration, spark generation, and discharge instability, and an electrostatic precipitator using the electrostatic charger. In addition, the present embodiment also provides an electrostatic charger using a discharge electrode of a fibrous conductor, that may solve this problem also in a thinning configuration of the charging unit and may be compatible with charge-up suppression affecting the periphery of the charging unit, and a ground electrode of a T-shaped plate, and an electrostatic precipitator using the electrostatic charger. Hereinafter, the former will be described as a first embodiment and the latter as a second embodiment for purposes of describing different features of the present disclosure. However, no limitation is intended by the indication of 'first embodiment', 'second embodiment', etc., and various modification may be made to one or more of the embodiments described herein.

FIG. 1 is a perspective view illustrating an overall configuration of an electrostatic precipitator 1 according to a first embodiment of the present disclosure.

As illustrated in the drawing, the electrostatic precipitator 1 includes a charging unit 10, a dust collecting unit 30, a fan 40, a housing 50 provided to accommodate these components, and a high voltage power supply 60 provided to supply a high voltage to the charging unit 10 and the dust collecting unit 30. In the drawing, the housing 50 is indicated by dotted lines so that the configurations of the charging unit 10 and the dust collecting unit 30 provided inside the housing 50 may be seen. The electrostatic precipitator 1 is configured in a two-stage electrostatic precipitation method in which the functions of the charging unit 10 and the dust collecting unit 30 are separated. The charging unit 10 and the dust collecting unit 30 may be configured in the form of a detachable unit. In the present embodiment, the charging unit 10 is provided as an example of an electrostatic charger.

A direction (ventilation direction) of an airflow (ventilation) is set in a direction from the charging unit 10 to the dust collecting unit 30 as indicated by arrows. The ventilation is performed by the fan 40 provided on a downstream side of the dust collecting unit 30 in the ventilation direction.

The charging unit 10 includes a plurality of discharge electrodes 11 provided to generate a discharge, a plurality of ground electrodes 12 provided to be grounded (GND), and a power feeding member 13 provided to feed a high voltage supplied from the high voltage power supply 60 to the plurality of discharge electrodes 11. Because the discharge electrode 11 is an electrode to which a high voltage is applied, the discharge electrode is also referred to as a high voltage electrode. Because the ground electrode 12 is provided to oppose (face) the discharge electrode 11, the ground electrode is also referred to as a counter electrode. Although the drawing illustrates discharge electrodes 11*a* to 11*f* as an example of the plurality of discharge electrodes 11, ground electrodes 12*a* to 12*c* as an example of the plurality of ground electrodes 12, and power feeding members 13*a* and 13*b* as an example of a plurality of the power feeding members 13, the number of the discharge electrodes 11, the ground electrodes 12, and the power feeding members 13 is not limited thereto.

In the present embodiment, the discharge electrode 11 is formed by a plurality of fibrous conductors (electrically conductive fibers). The plurality of fibrous conductors may be formed by bundling six thousands of carbon fibers having a fiber diameter of about 7 μm, for example. A rear end of this carbon fiber bundle may be caulked to a caulking part 14 and a front end thereof may be spread out in a brush shape to be used as the discharge electrode 11. In this case, a length of a portion protruding from the caulking part 14 of the fibrous conductor may be, for example, 5 mm, and a length from a front end of the fibrous conductor to a rear end (an end of the power feeding member 13 side) of the caulking part 14 may be, for example, 9 mm. In the drawing, the discharge electrodes 11*a* to 11*f* are configured by caulking the plurality of fibrous conductors to caulking parts 14*a* to 14*f*, respectively.

In the present embodiment, the discharge electrode 11 is arranged toward an upstream side of a processing airflow. For example, the power feeding members 13 on which three of the discharge electrodes 11 are installed with an interval of 95 mm are arranged in two rows such that the front end of the carbon fiber of the discharge electrode 11 is parallel to the processing airflow and directs to the upstream side of the processing airflow. In the drawing, the power feeding member 13*a* provided with the discharge electrodes 11*a* to 11*c* and the power feeding member 13*b* provided with the discharge electrodes 11*d* to 11*f* are arranged such that the front end of the carbon fiber of the discharge electrode 11 is parallel to the processing airflow and directs to the upstream side of the processing airflow.

In the present embodiment, the ground electrode 12 is disposed on both sides of the discharge electrode 11. That is, the ground electrode 12 is disposed at a position where the ions generated from the discharge electrode 11 by the discharge diffuse to direct to the upstream side of the processing airflow and to traverse the processing airflow. In other words, the ground electrode 12 is disposed at a position to attract the ions generated and diffused by the discharge electrode 11 in a direction of crossing the processing airflow. For example, the ground electrode 12 with a width of 10 mm is disposed at a position of 60 mm from the discharge electrode 11 in a direction of being orthogonal to the processing airflow so that a rear end of the caulking part 14 of the discharge electrode 11 and a rear end of the ground electrode 12 (the downstream end of the processing airflow) gather. In the drawing, the ground electrode 12*a* is disposed at a left position in the direction of being orthogonal to the processing airflow from the power feeding member 13*a* provided with the discharge electrodes 11*a* to 11*c*, and the ground electrode 12*b* is disposed at a right position in the direction of being orthogonal to the processing airflow from the power feeding member 13*b* provided with the discharge electrodes 11*d* to 11*f*. Also, the ground electrode 12*c* is disposed at the right position in the direction of being orthogonal to the processing airflow from the power feeding member 13*a* and at the left position in the direction of being orthogonal to the processing airflow from the power feeding member 13*b*.

The ground electrode 12 is composed of a plate-shaped member having an electrical conductivity (a plate-shaped electrically conductive member). Also, the ground electrode 12 is provided in a direction in which a plane of the plate-shaped member directs to the ventilation direction. In FIG. 1, the plane of the ground electrode 12 coincides with the ventilation direction (an angle between the plane of the ground electrode 12 and the ventilation direction is 0 degrees), but it is not necessary to coincide with the ventilation direction.

The dust collecting unit 30 includes a plate-shaped high voltage electrode 31 (first dust collecting electrode) in which a surface thereof is coated with a film of an insulating material and a plate-shaped counter electrode 32 (second dust collecting electrode) having an electrical conductivity, which are alternately stacked with each other. The counter electrode 32 may be in a form of releasing charges of charged particles, and may be in a form of being coated with a conductive resin film or the like. The ventilation direction is formed between the high voltage electrode 31 and the counter electrode 32. Because the counter electrode 32 may be grounded (GND), the counter electrode is also referred to as a ground electrode.

Polyethylene, polyethylene terephthalate (PET), polytetrafluoroethylene (PTFE), or the like may be used for a film of an insulating material covering a surface of the high voltage electrode 31.

The housing 50 is provided with an inlet 51 provided on the charging unit 10 side, which is the upstream side (wind upstream side) in the ventilation direction, and an outlet 52 provided on the dust collecting unit 30 side, which is the downstream side in the ventilation direction. A mesh (net), a grid, or the like may be provided at the inlet 51. It is appropriate that the mesh (net), the grid, or the like provided in the inlet 51 be provided to prevent a user from coming into contact with the charging unit 10 and to have a low resistance against ventilation. In addition, the inlet 51 may be provided with a pre-filter to limit the ingress of large-shaped particles.

The housing 50 is made of, for example, a resin material such as ABS (acrylonitrile, butadiene, styrene copolymer).

The fan 40 is provided at the outlet 52 on the downstream side that is provided in the housing 50. The airflow (ventilation) enters from the inlet 51 on the charging unit 10 side of the housing 50 and passes through the charging unit 10 and the dust collecting unit 30, and then comes out of the outlet 52 provided with the fan 40 in the housing 50.

At this time, the electrostatic precipitator 1 may be placed in any direction as long as the ventilation is not obstructed.

The high voltage power supply 60 applies a high voltage of direct current (DC) between the discharge electrode 11 and the ground electrode 12, so that a corona discharge (a discharge) between the discharge electrode 11 and the ground electrode 12 is generated. Ions generated by the corona discharge adhere to the suspended fine particles, thereby charging the suspended fine particles. In this case, the high voltage power supply 60 provided to apply a high voltage between the discharge electrode 11 and the ground electrode 12 as described above may be regarded as a part of the charging unit 10.

Also, the high voltage power supply 60 applies a high voltage of direct current (DC) between the high voltage electrode 31 and the counter electrode 32. Accordingly, the fine particles charged in the charging unit 10 adhere to a surface of the counter electrode 32 by the electrostatic force. Due to this, the suspended fine particles are collected. As such, the high voltage power supply 60 applying a high voltage between the high voltage electrode 31 and the counter electrode 32 may be considered as a part of the dust collecting unit 30.

[Effect of the Charging Unit According to the First Embodiment]

Figure 2:
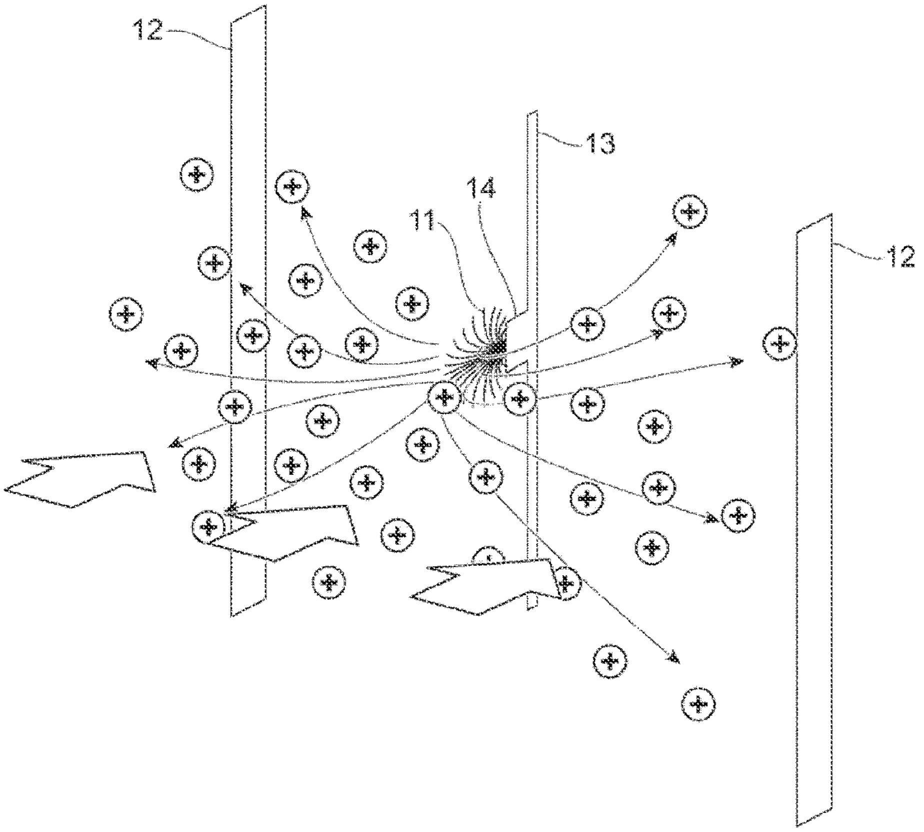
FIG. 2 is a perspective view illustrating flows of ions when a discharge is generated by a discharge electrode in an embodiment of the present disclosure.
Figure 3:
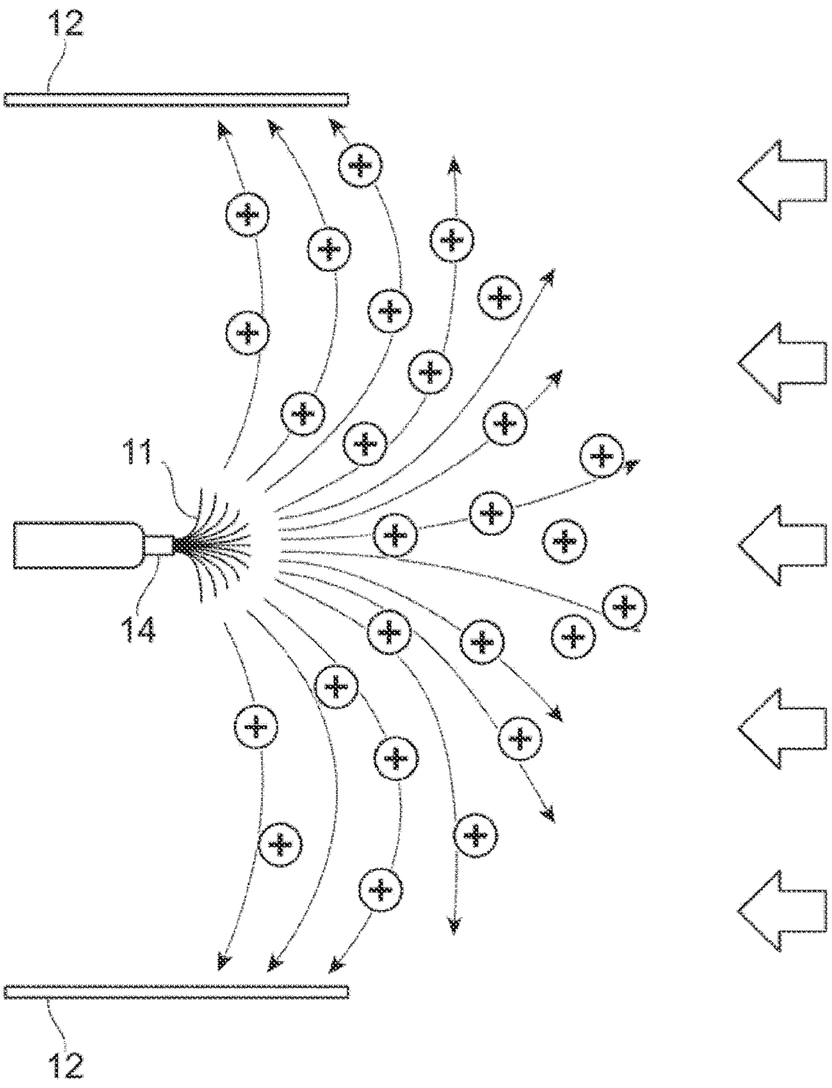
FIG. 3 is a plan view illustrating the flows of ions when the discharge is generated by the discharge electrode in an embodiment of the present disclosure.

FIGS. 2 and 3 are views illustrating flows of ions when a discharge is generated by the discharge electrode 11. FIG. 2 is an enlarged perspective view of a part A in FIG. 1, and FIG. 3 is a plan view of the part A in FIG. 1 viewed from above. In FIGS. 2 and 3, because positive ions are generated from the discharge electrode 11, a polarity of the high voltage power supply 60 (see FIG. 1) becomes positive.

As illustrated in the drawings, in the discharge electrode 11 of the present embodiment, the fibrous conductor opens (diffuses in a brush shape) to generate a discharge at the front end thereof. Because an amount of discharge at the front end of the fibrous conductor is very small, the ozone generation amount is very low. In addition, as the fibrous conductor opens, the ions generated by the discharge diffuse crossing the processing airflow, so that a charging efficiency of the suspended fine particles may be improved, thereby obtaining high dust collection performance.

In addition, in the present embodiment, because a discharge is generated at a fine front end portion of the fibrous conductor, a discharge may be generated even when the ground electrode 12 is disposed at a far distance from the discharge electrode 11. That is, the discharge gap (distance between the discharge electrode 11 and the ground electrode 12) may become large. Due to this, a current (discharge current) of the corona discharge is limited, so that the transition from the corona discharge to an arc discharge (spark discharge) may be suppressed.

Furthermore, in the present embodiment, because a potential is defined by the ground electrode 12 being grounded, the potential is stabilized. Due to this, because the discharge characteristics are difficult to be affected by the surrounding environment, a stable discharge may be easily obtained, and when the electrostatic precipitator 1 is mounted on a product, the freedom of installation may be increased.

The drawings illustrate that the entire discharge electrodes 11 are disposed on the downstream side of the processing airflow further than an end portion of the ground electrode 12 on the most upstream side of the processing airflow, but the present disclosure is not limited thereto. A part of the discharge electrodes 11 may be disposed on the downstream side of the processing airflow further than the end portion of the ground electrode 12 on the most upstream side of the processing airflow.

Hereinafter, the charging unit 10 illustrated in FIGS. 1 to 3 is referred to as embodiment 1, charging units according to the existing technology are referred to as comparative example 1 to comparative example 3, and effects of the charging unit 10 of embodiment 1 on the charging units of comparative example 1 to comparative example 3 will be described in detail.

First, the effect of embodiment 1 in which ions diffuse in directions of directing to the upstream side of the processing airflow and crossing the processing airflow, compared to comparative example 1 will be described.

Figure 4A:
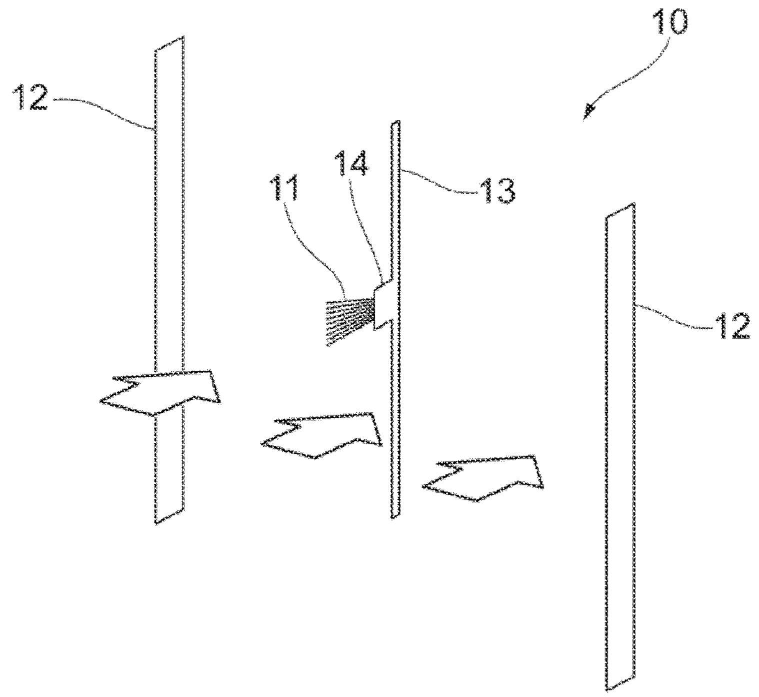
FIG. 4A is a perspective view illustrating a configuration of a charging unit according to an embodiment.
Figure 4B:
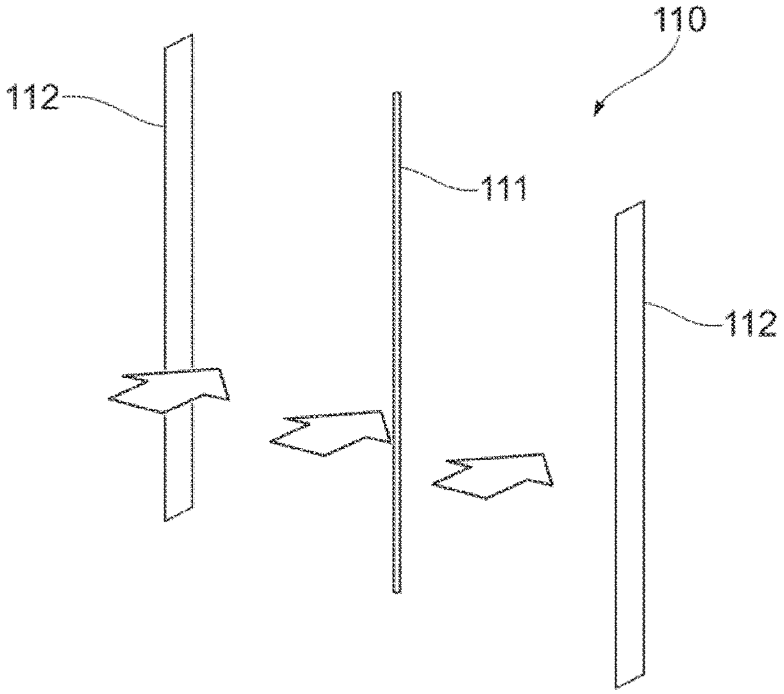
FIG. 4B is a perspective view illustrating a configuration of a charging unit of comparative example 1.

FIG. 4A is a perspective view illustrating a configuration of the charging unit of embodiment 1, and FIG. 4B is a perspective view illustrating a configuration of the charging unit of comparative example 1.

FIG. 4A is an enlarged perspective view of a part A in FIG. 1. As illustrated in the drawing, the charging unit 10 of embodiment 1 includes the discharge electrode 11 in which the plurality of fibrous conductors is caulked to the caulking part 14 to face the upstream side of the processing airflow, the ground electrode 12, and the power feeding member 13. FIG. 4B is an enlarged perspective view of a portion of comparative example 1 corresponding to the part A in FIG. 1. As illustrated in the drawing, a charging unit 110 of comparative example 1 includes a wire-shaped discharge electrode 111 and a ground electrode 112.

Figure 5:
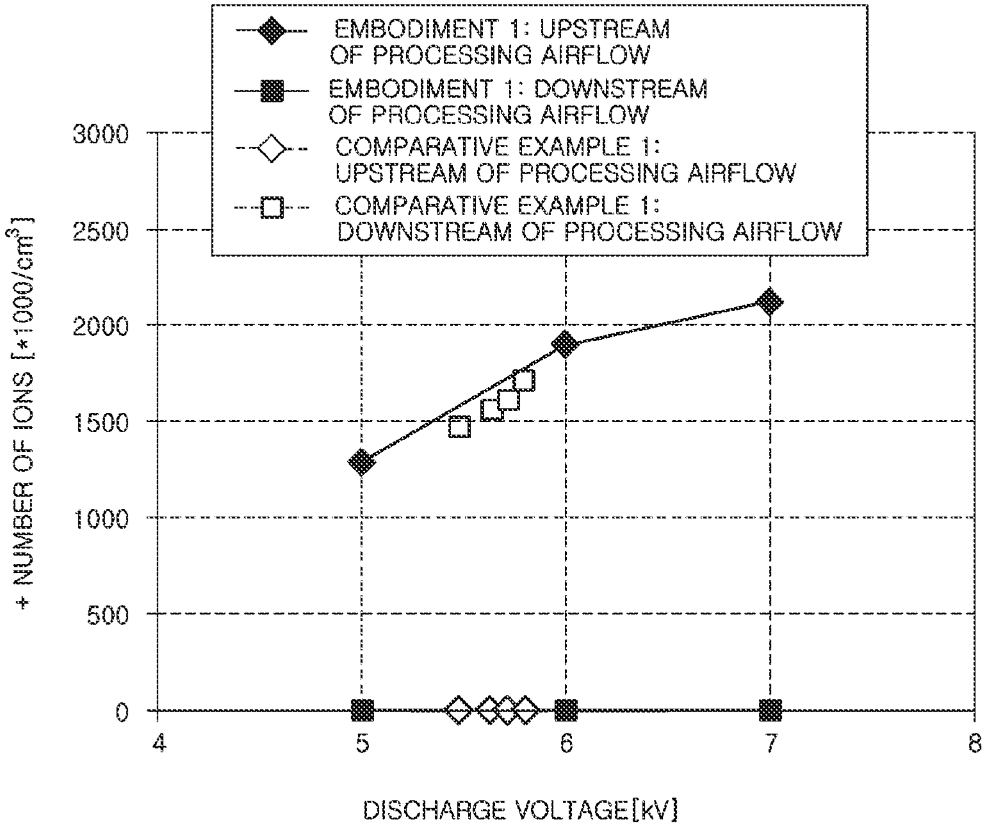
FIG. 5 is a graph illustrating a difference between the charging unit according to an embodiment and the charging unit of comparative example 1 in ion diffusion direction.

FIG. 5 is a graph illustrating a difference between the charging unit 10 of embodiment 1 and the charging unit 110 of comparative example 1 in ion diffusion direction. It may be seen from this graph that the ions generated by the charging unit 10 of embodiment 1 are supplied to the upstream side of the processing airflow, but not to the downstream side of the processing airflow. On the other hand, it may be seen that the ions generated by the charging unit 110 of comparative example 1 are supplied to the downstream side of the processing airflow, but not to the upstream side of the processing airflow.

Therefore, because the charging unit 10 of embodiment 1 is a complex charging method of electric field charging and diffusion charging, an upstream region in the discharge electrode 11 is used to charge the suspended fine particles. As a result, a wide charging space may be secured even in the electrostatic precipitator 1 (see FIG. 1) including the dust collecting unit 30 on the downstream side, so that a high charging efficiency may be easily obtained. On the other hand, because the charging unit 110 of comparative example 1 is an electric field charging method, the suspended fine particles are charged in a narrow region in a charging space. As a result, because the discharge current needs to be increased in order to obtain a high dust collection performance, the ozone generation amount increases.

Figure 6:
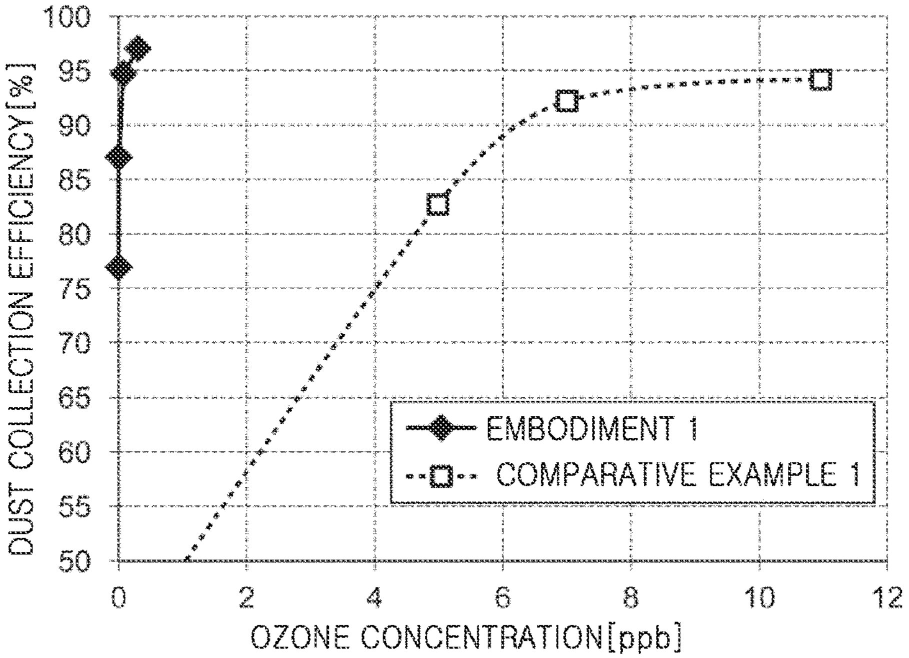
FIG. 6 is a graph illustrating a difference between the charging unit according to an embodiment and the charging unit of comparative example 1 in performance with respect to an ozone concentration to obtain dust collection performance.

FIG. 6 is a graph illustrating a difference between the charging unit 10 of embodiment 1 and the charging unit 110 of comparative example 1 in performance with respect to an ozone concentration to obtain the dust collection performance. It may be seen from this graph that in the charging unit 10 of embodiment 1, a high dust collection performance is obtained with a small discharge current, that is, a high dust collection performance may be obtained while suppressing the ozone generation amount to a low level. On the other hand, it may be seen that in the charging unit 110 of comparative example 1, a sufficient dust collection efficiency may not be obtained unless the discharge current is increased to such an extent that the ozone concentration exceeds 5 ppb.

Next, the effect of embodiment 1 in which ions diffuse in the directions of directing to the upstream side of the processing airflow and crossing the processing airflow, compared to comparative example 2 will be described.

Figure 7A:
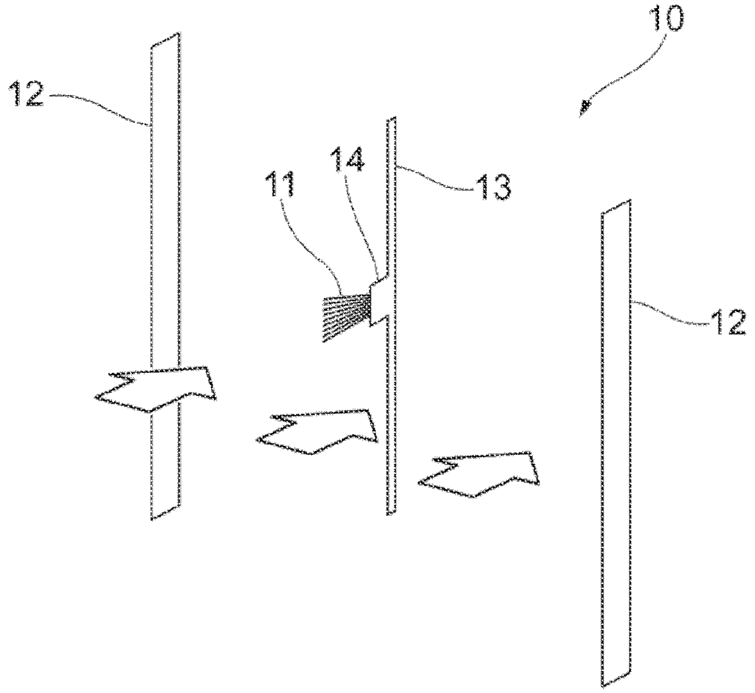
FIG. 7A is a perspective view illustrating the configuration of the charging unit according to an embodiment.
Figure 7B:
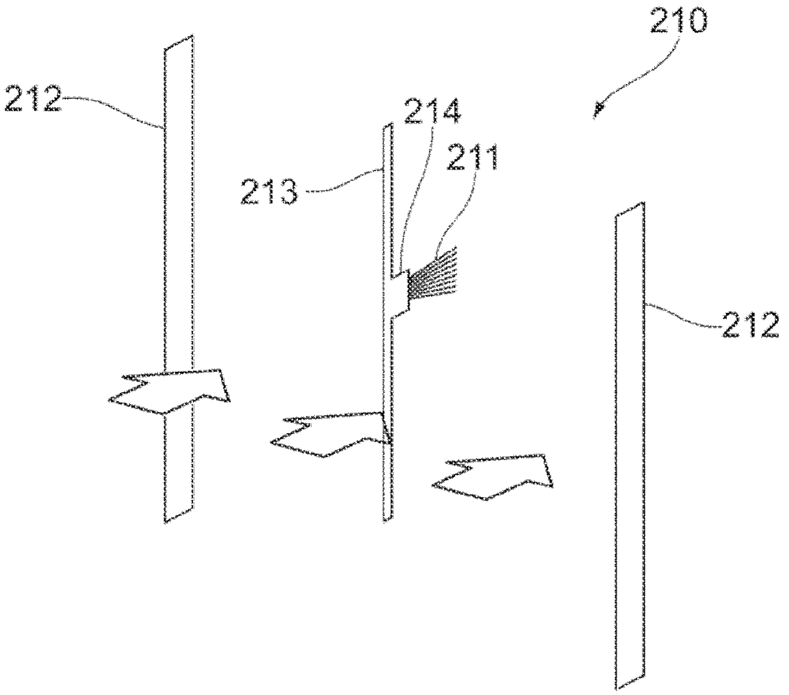
FIG. 7B is a perspective view illustrating a configuration of a charging unit of comparative example 2.

FIG. 7A is a perspective view illustrating the configuration of the charging unit of embodiment 1, and FIG. 7B is a perspective view illustrating a configuration of a charging unit of comparative example 2. FIG. 7A is the enlarged perspective view of the part A in FIG. 1. As illustrated in the drawing, the charging unit 10 of embodiment 1 includes the discharge electrode 11 in which the plurality of fibrous conductors is caulked to the caulking part 14 to face the upstream side of the processing airflow, the ground electrode 12, and the power feeding member 13. FIG. 7B is an enlarged perspective view of a portion of comparative example 2 corresponding to the part A in FIG. 1. As illustrated in the drawing, a charging unit 210 of comparative example 2 includes a discharge electrode 211 in which the plurality of fibrous conductors is caulked to a caulking part 214 to face the downstream side of the processing airflow, and a ground electrode 212.

The ions generated by the charging unit 10 of embodiment 1 are supplied to the upstream side of the processing airflow. On the other hand, the ions generated by the charging unit 210 of comparative example 2 are supplied to the downstream side of the processing airflow. Accordingly, the charging unit 10 of embodiment 1 charges the suspended fine particles by using the upstream region in the discharge electrode 11. As a result, a wide charging space may be secured even in the electrostatic precipitator 1 (see FIG. 1) including the dust collecting unit 30 on the downstream side, so that a high charging efficiency may be easily obtained. On the other hand, in the charging unit 210 of comparative example 2, the suspended fine particles are charged in a narrow region in the charging space. As a result, because the discharge current needs to be increased in order to obtain a high dust collection performance, the ozone generation amount increases.

Figure 8:
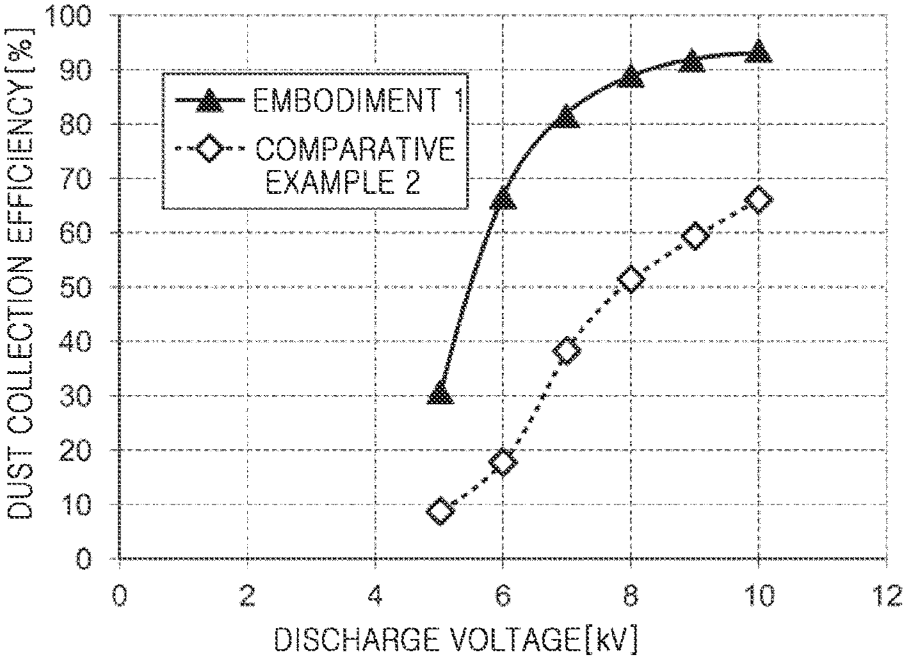
FIG. 8 is a graph illustrating a difference between the charging unit of embodiment 1 and the charging unit of comparative example 2 in performance with respect to a discharge voltage to obtain the dust collection performance.

FIG. 8 is a graph illustrating a difference between the charging unit 10 of embodiment 1 and the charging unit 210 of comparative example 2 in performance with respect to a discharge voltage to obtain the dust collection performance. It may be seen from this graph that the charging unit 210 of comparative example 2 requires a larger discharge voltage than the charging unit 10 of embodiment 1 in order to obtain the same dust collection performance.

Next, the effect of embodiment 1, in which a large discharge gap is formed, compared to comparative example 1 will be described.

Figure 9:
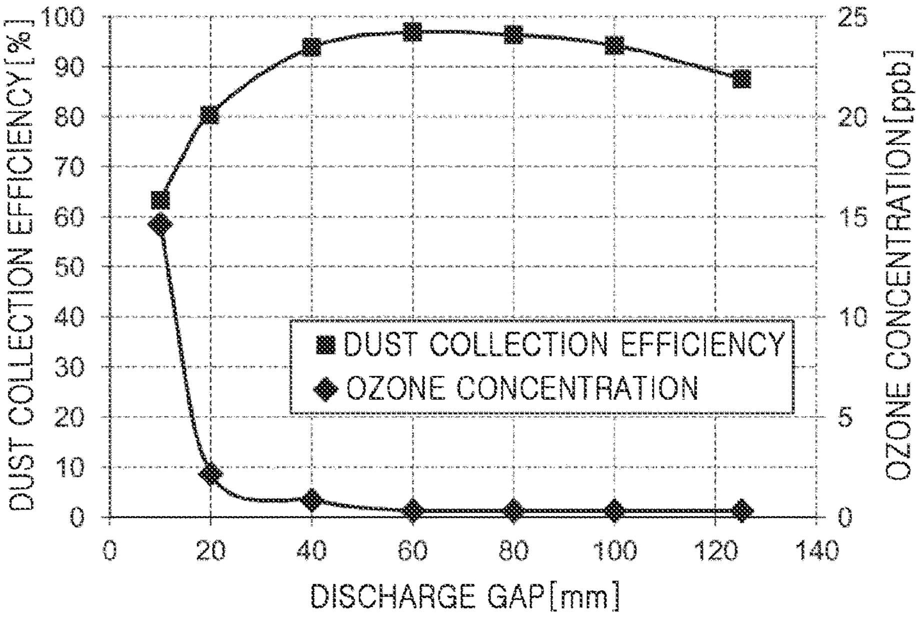
FIG. 9 is a graph illustrating relationships between a discharge gap, the dust collection performance, and an ozone generation characteristic in the charging unit according to an embodiment.

FIG. 9 is a graph illustrating relationships between the discharge gap, the dust collection efficiency, and the ozone generation in the charging unit 10 of embodiment 1. It may be seen from this graph that in the charging unit 10 of embodiment 1, when the distance between the discharge electrode 11 and the ground electrode 12, that is, the discharge gap is increased, the dust collection performance increases, but when the discharge gap exceeds a predetermined value, the dust collection performance decreases slightly. In addition, it may be seen that the larger the discharge gap, the lower the ozone generation amount. Specifically, when the discharge gap is set to 20 mm or more and 100 mm or less, the dust collecting effect is high and the ozone generation amount is low.

Figure 10:
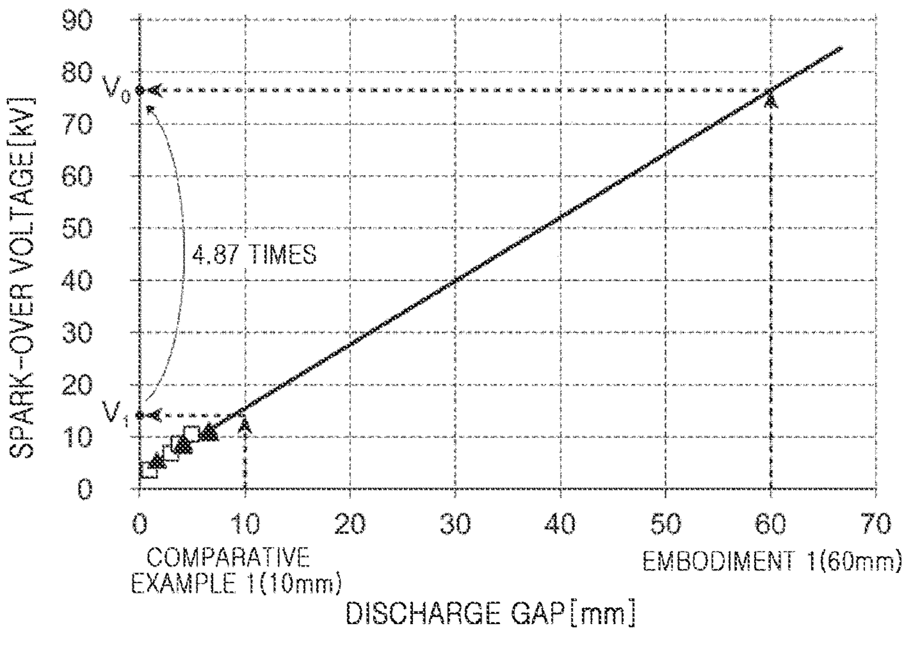
FIG. 10 is a graph illustrating a relationship between the discharge gap and a spark resistance.

FIG. 10 is a graph illustrating a relationship between the discharge gap and a spark resistance. In the graph, a ▲ mark indicates actual measured values of the discharge gap and a spark-over voltage when a spark is generated in the discharge electrode 11 of embodiment 1, and a □ mark is a plot of actual measured values of the discharge gap and a spark-over voltage when a spark is generated in the discharge electrode 111 of comparative example 1. In addition, a straight line directing to an upper right side represents a relationship between the discharge gap and the spark-over voltage that are calculated from these actual measured values.

In embodiment 1, the discharge gap is set to 60 mm as described above. On the other hand, in comparative example 1, it is assumed that the discharge gap is 10 mm. The graph shows that a voltage V0 for generating a spark when the discharge gap is 60 mm as in embodiment 1 is about 4.87 times a voltage V1 for generating a spark when the discharge gap is 10 mm as in comparative example 1. That is, the graph shows that when the distance between the discharge electrode 11 and the ground electrode 12 is increased as in embodiment 1, abnormalities such as spark generation may not occur.

Next, the effect of stably obtaining a discharge without being influenced by the surrounding environment of embodiment 1 will be described in comparison with comparative example 3.

Figure 11A:
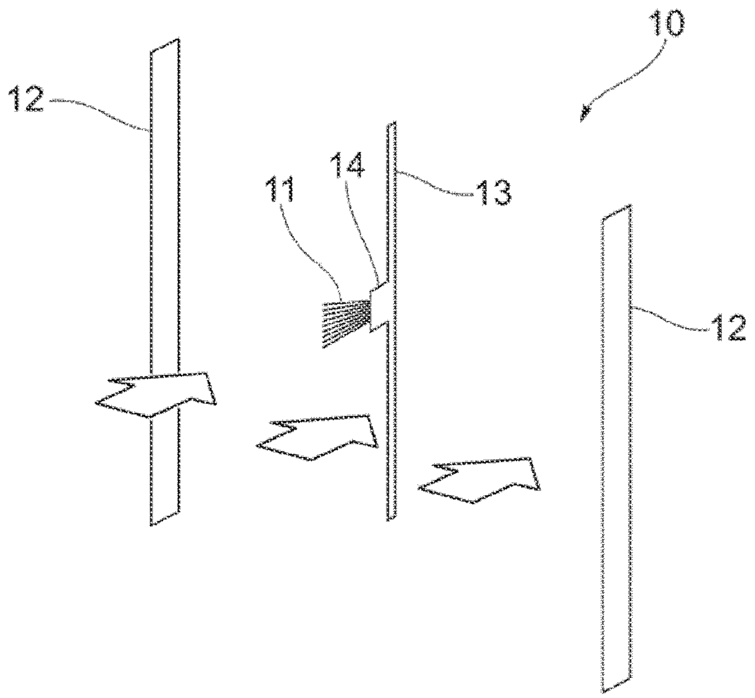
FIG. 11A is a perspective view illustrating the configuration of the charging unit according to an embodiment.
Figure 11B:
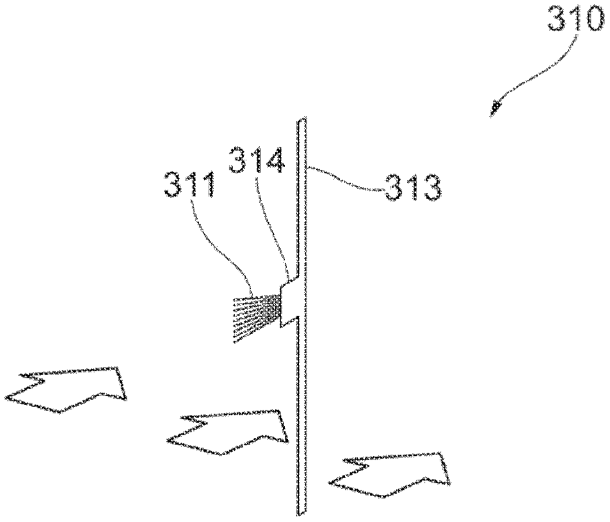
FIG. 11B is a perspective view illustrating a configuration of a charging unit of comparative example 3.

FIG. 11A is a perspective view illustrating the configuration of the charging unit of embodiment 1, and FIG. 11B is a perspective view illustrating a configuration of a charging unit of comparative example 3. FIG. 11A is the enlarged perspective view of the part A in FIG. 1. As illustrated in the drawing, the charging unit 10 of embodiment 1 includes the discharge electrode 11 in which the plurality of fibrous conductors is caulked to the caulking part 14 to face the upstream side of the processing airflow, the ground electrode 12, and the power feeding member 13. FIG. 11B is an enlarged perspective view of a portion of comparative example 3 corresponding to the part A in FIG. 1. As illustrated in the drawing, a charging unit 310 of comparative example 3 includes a discharge electrode 311 in which the plurality of fibrous conductors is caulked to a caulking part 314 to face the upstream side of the processing airflow, and a power feeding member 313.

In the charging unit 10 of embodiment 1, the potential between the discharge electrode 11 and the ground electrode 12 is defined by providing the ground electrode 12. Because the discharge characteristic is not affected by the surrounding environment compared to a method in which there is no the ground electrode 12 as in comparative example 3, a stable discharge may be easily obtained. Therefore, the freedom of installation is increased when the electrostatic precipitator 1 is mounted on a product.

Figure 12:
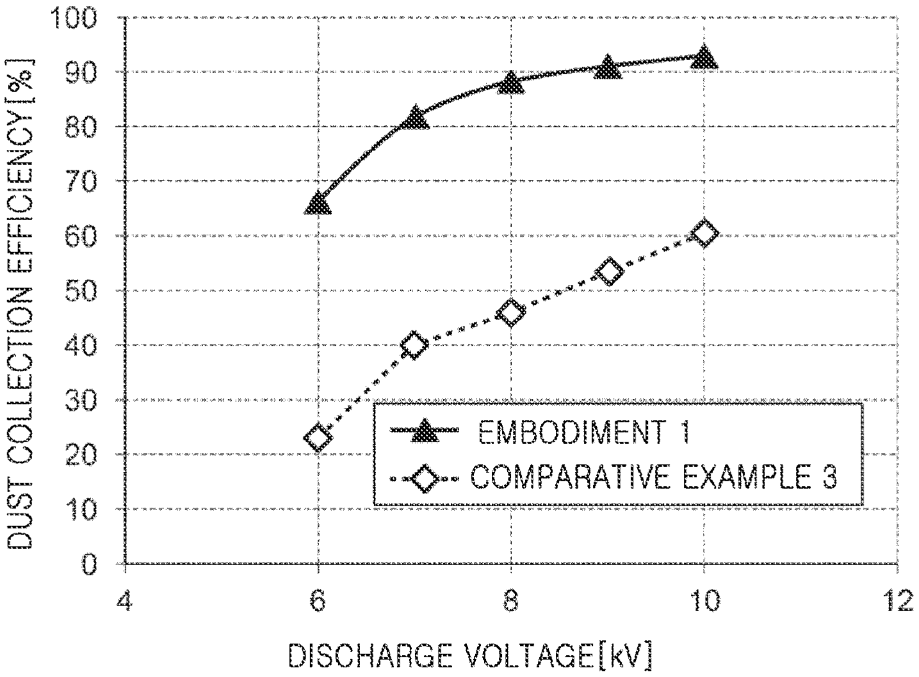
FIG. 12 is a graph illustrating a difference between the charging unit according to an embodiment and the charging unit of comparative example 3 in performance with respect to the discharge voltage to obtain the dust collection performance.

FIG. 12 is a graph illustrating a difference between the charging unit 10 of embodiment 1 and the charging unit 310 of comparative example 3 in performance with respect to the discharge voltage to obtain the dust collection performance. It may be seen from this graph that the charging unit 310 of comparative example 3 requires a larger discharge voltage than the charging unit 10 of embodiment 1 in order to obtain the same dust collection performance.

Modified Example 1 of the First Embodiment

Figure 13:
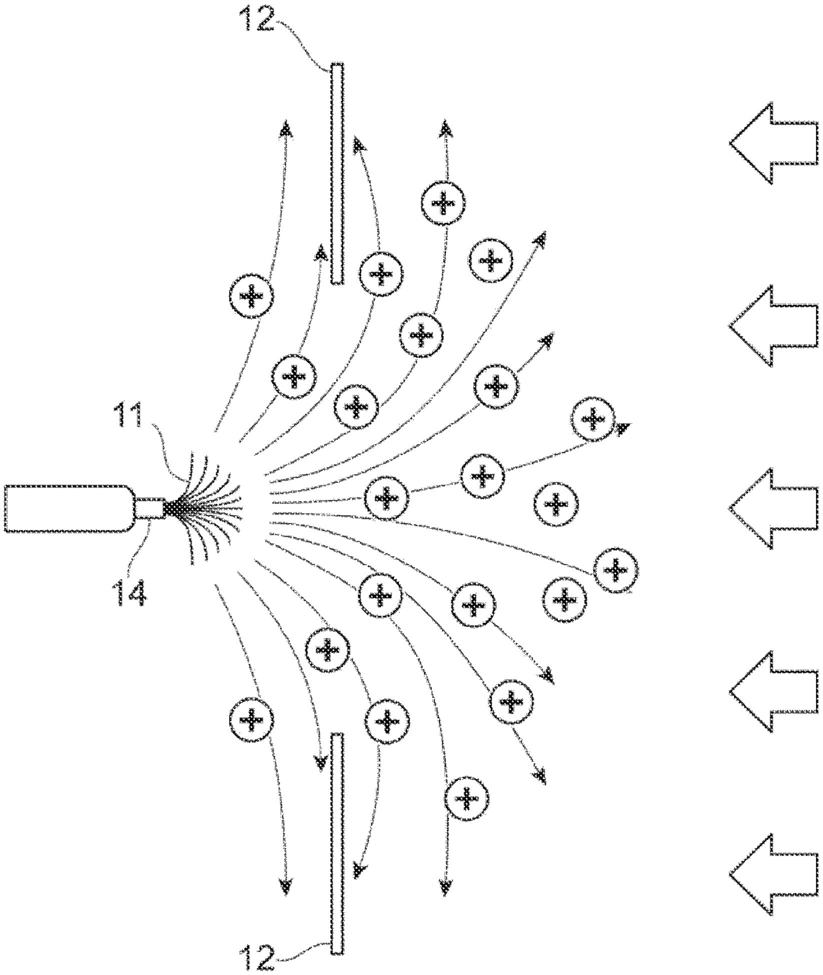
FIG. 13 is a plan view illustrating a modified example of an embodiment of the present disclosure.

FIG. 13 is a plan view of the part A in FIG. 1 viewed from above, illustrating a modified example of the present embodiment.

Embodiment 1 illustrates that the ground electrode 12 is disposed parallel to the processing airflow in a state in which the discharge electrode 11 faces the upstream side of the processing airflow, but the present disclosure is not limited thereto. As illustrated in the drawing, in modified example 1, the ground electrode 12 is disposed in the direction of being orthogonal to the processing airflow (direction transverse to or of crossing the processing airflow). Even in this configuration, because the ions generated by the discharge diffuse to traverse (cross) the processing airflow, the same effect as that of embodiment 1 may be obtained.

In this case, the drawing illustrates that the entire discharge electrodes 11 are disposed on the downstream side of the processing airflow further than the end portion of the ground electrode 12 on the most upstream side (end surface of the upstream side) of the processing airflow, but the present disclosure is not limited thereto. A part of the discharge electrodes 11 may be disposed on the downstream side of the processing airflow further than the end portion of the ground electrode 12 (end surface of the upstream side) on the most upstream side of the processing airflow.

That is, in the present embodiment, all or at least a part of a plurality of fibrous conductors of the discharge electrode 11 disposed between the ground electrodes 12 in the processing airflow may be disposed on the downstream side of the processing airflow further than the end portion of the ground electrode 12 on the most upstream side of the processing airflow.

Modified Example 2 of the First Embodiment

In embodiment 1, the discharge electrode 11 is disposed toward the upstream side of the processing airflow, but the present disclosure is not limited thereto. In modified example 2, the discharge electrode 11 is disposed toward the upstream and downstream sides of the processing airflow. In this case, the discharge electrode 11 has a shape in which the discharge electrode 11 illustrated in FIG. 7A and the discharge electrode 211 illustrated in FIG. 7B are combined. It is only sufficient to dispose at least a part of the discharge electrodes 11 toward the upstream side of the processing airflow. That is, the discharge electrodes 11 may include a part facing the upstream direction of the processing airflow, and may further include a part facing the downstream direction of the processing airflow.

Modified Example 3 of the First Embodiment

Embodiment 1 illustrates that the high voltage electrode 31 and the counter electrode 32 are provided as the dust collecting unit 30, and when a high voltage of direct current (DC) is applied by the high voltage power supply 60, the suspended fine particles charged in the charging unit 10 adhere to the surface of the counter electrode 32 by an electrostatic force to collect the suspended fine particles, the present disclosure is not limited thereto. In modified example 3, as the dust collecting unit 30, a dust collecting filter electret-processed with a fiber filter is used rather than the electrode type dust collecting filter illustrated in FIG. 1. The former dust collecting filter is a dust collecting filter of a type applying a voltage, while the latter dust collecting filter is a dust collecting filter of a type not applying a voltage. Alternatively, a heat exchanger may be used as the dust collecting unit 30. When the heat exchanger is used, for example, the charging unit 10 is disposed at an air intake port of an air conditioner, and the air discharged from the charging unit 10 passes through the GND-connected (grounded) heat exchanger, so that the suspended fine particulates may be removed. When such the dust collecting unit 30 is used, the electrostatic precipitator 1 may be regarded as a dust collecting device.

Modified Example 4 of the First Embodiment

Embodiment 1 only exemplifies that the high voltage power supply 60 applies a high voltage of direct current (DC) between the discharge electrode 11 and the ground electrode 12. In modified example 4, the high voltage power supply 60 uses any one of the following high voltage application ways.

First, it is to apply a DC high voltage of a positive polarity. Because dust does not easily adhere to the discharge electrode 11 and the ground electrode 12 by this way, the life of the electrodes may be extended.

Second, it is to apply a DC high voltage of a negative polarity. In the corona discharge, in general, the ozone generation amount is remarkably increased in the negative polarity compared to the positive polarity, but in the present embodiment, because ozone generation is suppressed even in the negative polarity, the negative polarity may be used similarly to the positive polarity.

Third, it is to apply a high voltage of a positive or negative pulse type or alternating type (alternating current). Both the effect in the case of applying the DC high voltage of the positive polarity and the effect in the case of applying the DC high voltage of the negative polarity may be obtained by this way. In addition, when the pulse type (alternating current) high voltage is applied, power saving is achieved.

Fourth, it is to apply a high voltage having a polarity opposite to that of a generally applied high voltage at predetermined intervals. When the charging unit 10 charges suspended fine particulates, the charging unit 10 may also charge other peripheral parts (housing 50 or the like). The charge-up of the peripheral parts (housing 50 or the like) of the charging unit 10 is alleviated by applying the high voltage as described above.

Configuration of an Electrostatic Precipitator According to a Second Embodiment

Figure 14:
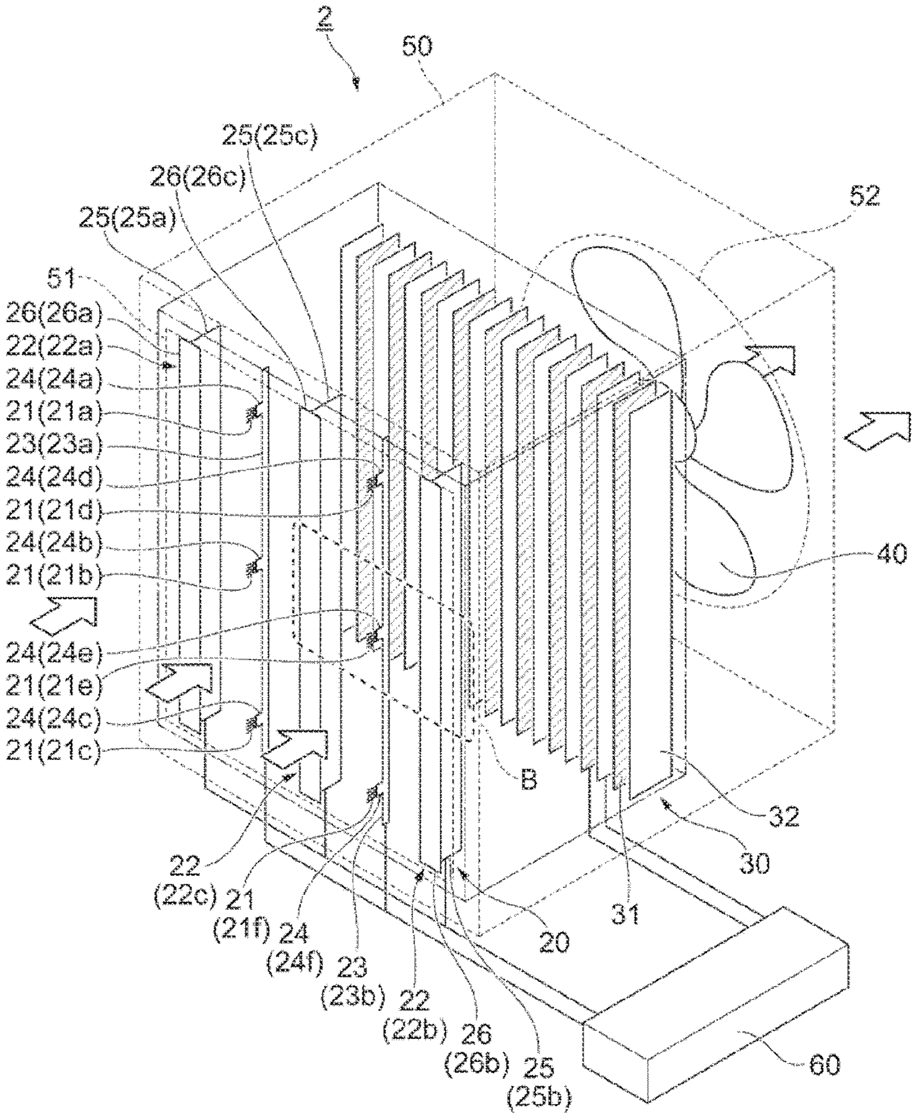
FIG. 14 is a perspective view illustrating an overall configuration of an electrostatic precipitator according to an embodiment of the present disclosure.

FIG. 14 is a perspective view illustrating an overall configuration of an electrostatic precipitator 2 according to a second embodiment of the present disclosure.

As illustrated in the drawing, the electrostatic precipitator 2 includes a charging unit 20, the dust collecting unit 30, the fan 40, the housing 50 provided to accommodate these components, and the high voltage power supply 60 provided to supply a high voltage to the charging unit 20 and the dust collecting unit 30. In the drawing, the housing 50 is indicated by dotted lines so that the configurations of the charging unit 20 and the dust collecting unit 30 provided inside the housing 50 may be seen. The electrostatic precipitator 2 is configured in a two-stage electrostatic precipitation method in which the functions of the charging unit 20 and the dust collecting unit 30 are separated. The charging unit 20 and the dust collecting unit 30 may be configured in the form of a detachable unit. In the present embodiment, the charging unit 20 is provided as an example of an electrostatic charger.

A direction (ventilation direction) of an airflow (ventilation) is set in a direction from the charging unit 20 to the dust collecting unit 30 as indicated by arrows. The ventilation is performed by the fan 40 provided on a downstream side of the dust collecting unit 30 in the ventilation direction.

The charging unit 20 includes a plurality of discharge electrodes 21 provided to generate a discharge, a plurality of ground electrodes 22 provided to be grounded (GND), and a power feeding member 23 provided to feed a high voltage supplied from the high voltage power supply 60 to the plurality of discharge electrodes 21. Because the discharge electrode 21 is an electrode to which a high voltage is applied, the discharge electrode is also referred to as a high voltage electrode. Because the ground electrode 22 is provided to face the discharge electrode 21, the ground electrode is also referred to as a counter electrode. Although the drawing illustrates discharge electrodes 21*a* to 21*f* as an example of the plurality of discharge electrodes 21, ground electrodes 22*a* to 22*c* as an example of the plurality of ground electrodes 22, and power feeding members 23*a* and 23*b* as an example of a plurality of the power feeding members 23, the number of the discharge electrodes 21, the ground electrodes 22, and the power feeding members 23 is not limited thereto.

In the present embodiment, the discharge electrode 21 is formed by a plurality of fibrous conductors. The plurality of fibrous conductors may be formed by bundling six thousands of carbon fibers having a fiber diameter of about 7 μm, for example. A rear end of this carbon fiber bundle may be caulked to a caulking part 24 and a front end thereof may be spread out in a brush shape to be used as the discharge electrode 21. In this case, a length of a portion protruding from the caulking part 24 of the fibrous conductor may be, for example, 5 mm, and a length from a front end of the fibrous conductor to a rear end (an end of the power feeding member 23 side) of the caulking part 24 may be, for example, 9 mm. In the drawing, the discharge electrodes 21*a* to 21*f* are configured by caulking the plurality of fibrous conductors to caulking parts 24*a* to 24*f*, respectively.

In the present embodiment, the discharge electrode 21 is arranged toward an upstream side of a processing airflow. For example, the power feeding members 23 on which three of the discharge electrodes 21 are installed with an interval of 95 mm are arranged in two rows such that the front end of the carbon fiber of the discharge electrode 21 is parallel to the processing airflow and directs to the upstream side of the processing airflow. In the drawing, the power feeding member 23*a* provided with the discharge electrodes 21*a* to 21*c* and the power feeding member 23*b* provided with the discharge electrodes 21*d* to 21*f* are arranged such that the front end of the carbon fiber of the discharge electrode 21 is parallel to the processing airflow and directs to the upstream side of the processing airflow.

In the present embodiment, the ground electrode 22 is disposed on both sides of the discharge electrode 21. The ground electrode 22 is provided as a T-shaped ground electrode including a leg part 25 and a head part 26. That is, the T-shaped ground electrode 22 is disposed at a position where the ions generated from the discharge electrode 21 by the discharge diffuse to direct to the upstream side of the processing airflow and to traverse the processing airflow. In other words, the T-shaped ground electrode 22 is disposed at a position to attract the ions generated and diffused by the discharge electrode 21 in a direction of crossing the processing airflow. For example, the ground electrode 22 having a width of the leg part 25 of 10 mm and a width of the head part 26 of 10 mm is disposed at a position of 60 mm from the discharge electrode 21 in a direction of being orthogonal to the processing airflow so that a rear end of the caulking part 24 of the discharge electrode 21 and a rear end of the leg part 25 of the ground electrode 22 (the downstream end of the processing airflow) are provided. In the drawing, the ground electrode 22*a* including the leg part 25*a* and the head part 26*a* is disposed at a left position in the direction of being orthogonal to the processing airflow from the power feeding member 23*a* provided with the discharge electrodes 21*a* to 21*c*, and the ground electrode 22*b* including the leg part 25*b* and the head part 26*b* is disposed at a right position in the direction of being orthogonal to the processing airflow from the power feeding member 23*b* provided with the discharge electrodes 21*d* to 21*f*. Also, the ground electrode 22*c* including the leg part 25*c* and the head part 26*c* is disposed at the right position in the direction of being orthogonal to the processing airflow from the power feeding member 23*a* and at the left position in the direction of being orthogonal to the processing airflow from the power feeding member 23*b*.

The leg part 25 and the head part 26 are composed of a plate-shaped member having conductivity (a plate-shaped electrically conductive member). Also, the leg part 25 is provided in a direction in which a plane of the plate-shaped member directs to the ventilation direction, and the head part 26 is provided in a direction in which a plane of the plate-shaped member crosses the ventilation direction (direction of intersecting the ventilation direction). In FIG. 14, the plane of the leg part 25 coincides with the ventilation direction (an angle between the plane of the leg part 25 and the ventilation direction is 0 degrees), but it is not necessary to coincide with the ventilation direction, and the plane of the head part 26 is orthogonal to the ventilation direction (an angle between the plane of the head part 26 and the ventilation direction is 90 degrees), but it is not necessary to be orthogonal to the ventilation direction. In the present embodiment, the leg part 25 is provided as an example of a plate-shaped first electrode part disposed in a direction toward the processing airflow, and the head part 26 is provided as an example of a plate-shaped second electrode part disposed in a direction of crossing the processing airflow (a direction intersecting the processing airflow). Also, the T-shaped ground electrode 22 is used as an example of a ground electrode formed by connecting a front end portion of the first electrode part on the upstream side of the processing airflow and a center portion of the second electrode part so that the first electrode part and the second electrode part are substantially perpendicular.

As described above, the discharge electrode 21 is disposed between two of the adjacent ground electrodes 22, but the discharge electrode 21 may be disposed at the center between two of the adjacent ground electrodes 22. Also, as described above, the ground electrode 22 is disposed at a position of 60 mm from the discharge electrode 21, but is not limited thereto. The ground electrode 22 may be disposed at a position of 20 mm or more and 100 mm or less from the discharge electrode 21. This is because when a distance from the discharge electrode 21 to the ground electrode 22 is less than 20 mm, the ozone generation amount increases, and when the distance from the discharge electrode 21 to the ground electrode 22 exceeds 100 mm, the dust collection efficiency decreases.

Because the dust collecting unit 30, the fan 40, the housing 50, and the high voltage power supply 60 are the same as those described in the first embodiment, a detailed description thereof will be omitted.

Effect of the Charging Unit According to the Second Embodiment

Figure 15:
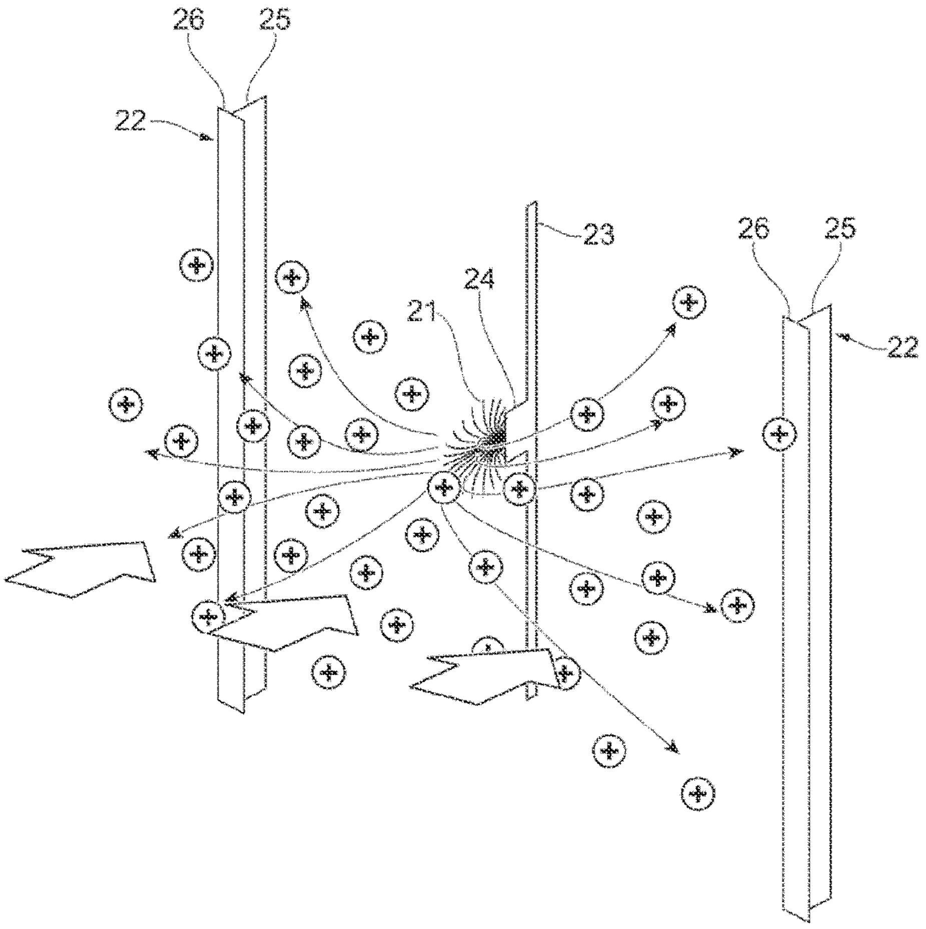
FIG. 15 is a perspective view illustrating flows of ions when a discharge is generated by a discharge electrode in an embodiment of the present disclosure.
Figure 16:
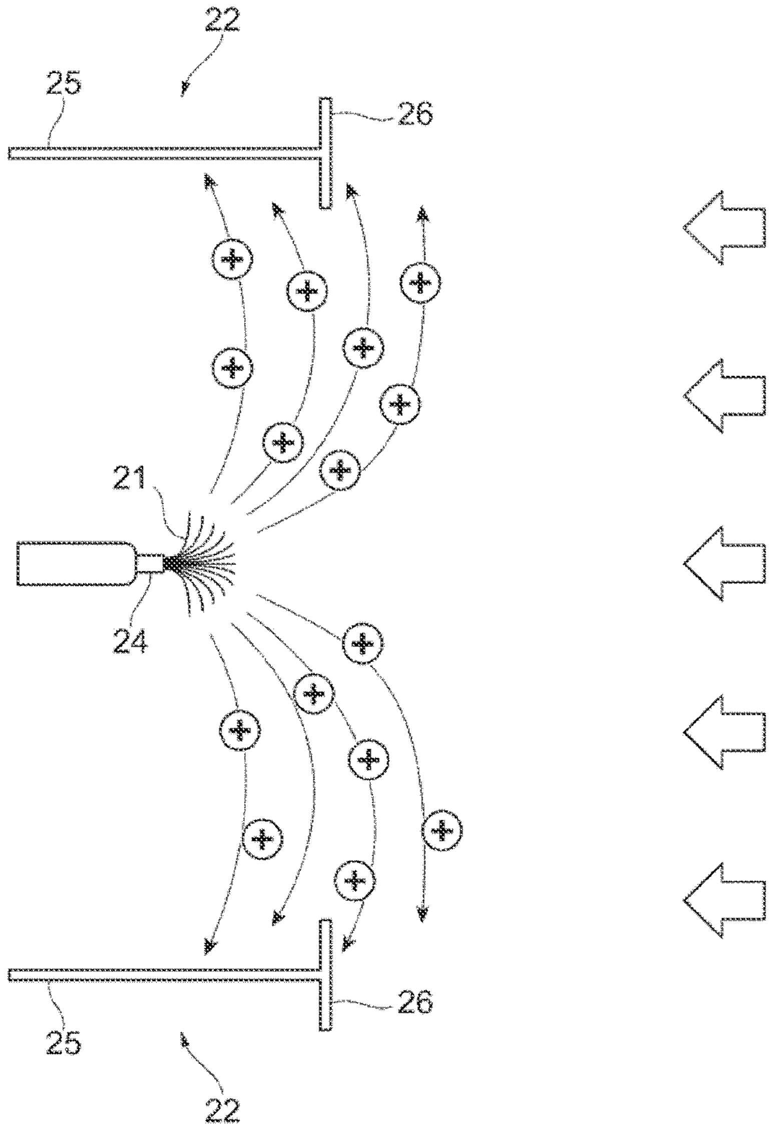
FIG. 16 is a plan view illustrating the flows of ions when the discharge is generated by the discharge electrode in an embodiment of the present disclosure.

FIGS. 15 and 16 are views illustrating flows of ions when a discharge is generated by the discharge electrode 21. FIG. 15 is an enlarged perspective view of a part B in FIG. 14, and FIG. 16 is a plan view of the part B in FIG. 14 viewed from above.

As illustrated in the drawings, in the discharge electrode 21 of the present embodiment, the fibrous conductor opens to generate a discharge at a front end thereof. Because an amount of discharge at the front end of the fibrous conductor is very small, the ozone generation amount is very low.

In the present embodiment, the ground electrode 22 is formed in a T-shape composed of the leg part 25 and the head part 26 to increase an electric field strength in a narrow space between the discharge electrode 21 and the T-shaped ground electrode 22, that is, to increase an ion density, so that a diffusion charge efficiency in a narrow space may be improved. In addition, an ion diffusion range to an outer periphery by the head part 26 may be controlled. Accordingly, the improvement of the dust collection efficiency and the reduction of the surrounding charge-up charging may be compatible.

In addition, in the present embodiment, because a potential is defined by the ground electrode 22 being grounded, the potential is stabilized. Due to this, because the discharge characteristics are difficult to be affected by the surrounding environment, a stable discharge may be easily obtained, and when the electrostatic precipitator 2 is mounted on a product, the freedom of installation may be increased.

Furthermore, in the present embodiment, because a discharge is generated at a fine front end portion of the fibrous conductor, a discharge may be generated even when the ground electrode 22 is disposed at a far distance from the discharge electrode 21. That is, a discharge gap may become large. This makes it difficult to generate a spark discharge.

Hereinafter, the charging unit 10 illustrated in FIGS. 1 to 3 is referred to as embodiment 1, the charging unit 10 illustrated in FIG. 13 is referred to as embodiment 2, the charging unit 20 illustrated in FIGS. 14 to 16 is referred to as embodiment 3, embodiments in cases where the discharge electrodes 11 and 21 in the charging units 10 and 20 of embodiments 1 to 3 are orthogonal to the processing airflow are referred to as embodiments 4 to 6, respectively, and effects of embodiments 4 to 6 will be described in detail.

FIG. 17 is a diagram illustrating effects of embodiments 1 to 3.

As shown in the field "discharge electrode installation direction" in the drawing, the discharge electrodes 11 and 21 in embodiments 1 to 3 are arranged toward the upstream direction of the processing airflow. In this case, ions generated by the charging units 10 and 20 are supplied to the upstream side of the processing airflow.

In the field "ground electrode", L1 refers to a width of the plate-shaped members (electrically conductive member) of the ground electrodes 12 and 22 in a direction of being parallel to the processing airflow, and L2 refers to a width of the plate-shaped members (electrically conductive member)

of the ground electrodes 12 and 22 in the direction of being orthogonal to the processing airflow.

In the field "charging unit configuration", the configuration of the charging units 10 and 20 in FIGS. 1 to 3 and 13, in which an upper side thereof is in the upstream direction of the processing airflow, is shown. That is, in embodiment 1, as described in the first embodiment, the ground electrode 12 is disposed in the direction of being parallel to the processing airflow. In embodiment 2, as described in the modified example of the first embodiment, the ground electrode 12 is disposed in the direction of being orthogonal to the processing airflow. On the other hand, in embodiment 3, as described in the second embodiment, the ground electrode 22 is formed in a T-shape disposed in both the directions of being parallel to the processing airflow and of being orthogonal to the processing airflow.

The field "dust collection efficiency" shows a dust collection rate when a wind speed of the processing airflow is 1 m/s. It may be seen from values in the fields "dust collection efficiency and ozone generation amount" that any embodiments may increase the dust collection efficiency and may also suppress the ozone generation amount to become low. The field "charge-up rate" shows a charge-up rate of the housing when embodiment 1 is "1.0". It may be seen from the charge-up rate that embodiment 3 may reduce the charge-up the most compared to other embodiments. Therefore, embodiment 3 among embodiments 1 to 3 may increase the dust collection efficiency the most, and also reduce the charge-up the most.

FIG. 18 is a diagram illustrating effects of embodiments 4 to 6.

In the drawing, as shown in the field "discharge electrode installation direction", in embodiments 4 to 6, the discharge electrodes 11 and 21 are disposed toward the direction of being orthogonal to the processing airflow. In this case, ions generated by the charging units 10 and 20 are mainly supplied in the direction of being orthogonal to the processing airflow.

The meanings of L1 and L2 in the field "ground electrode" are the same as in FIG. 17.

The field "charging unit configuration" shows a configuration in which the discharge electrodes 11 and 21 of the charging units 10 and 20 in FIGS. 1 to 3 and 13, in which an upper side thereof is in the upstream direction of the processing airflow, are disposed to be orthogonal to the processing airflow. That is, in embodiment 4, as described in the first embodiment, the ground electrode 12 is disposed in the direction of being parallel to the processing airflow. In embodiment 5, as described in the modified example of the first embodiment, the ground electrode 12 is disposed in the direction of being orthogonal to the processing airflow. On the other hand, in embodiment 6, as described in the second embodiment, the ground electrode 22 is formed in a T-shape disposed in both the directions of being parallel to the processing airflow and of being orthogonal to the processing airflow.

The field "dust collection efficiency" shows a dust collection rate when a wind speed of the processing airflow is 1 m/s. It may be seen from values in the fields "dust collection efficiency and ozone generation amount" that any embodiments may increase the dust collection efficiency and may also suppress the ozone generation amount to become low. The field "charge-up rate" shows a charge-up rate of the housing when embodiment 4 is "1.0". It may be seen from the charge-up rate that embodiment 6 may reduce the charge-up the most compared to other embodiments. Therefore, embodiment 6 among embodiments 4 to 6 may increase the dust collection efficiency the most, and also reduce the charge-up the most.

Figure 19:
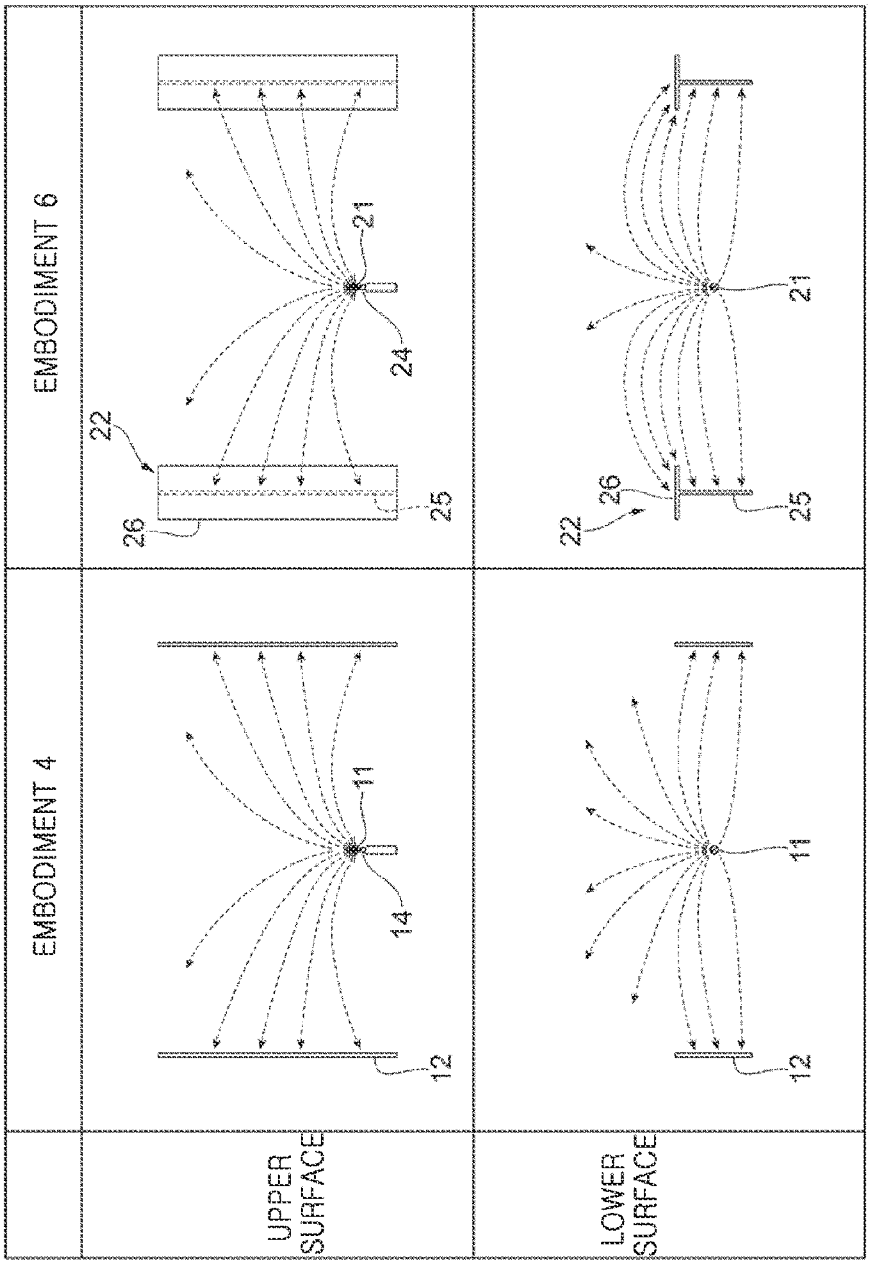
FIG. 19 is a diagram specifically illustrating a difference in effects of a charging unit according to one embodiment and a charging unit of according to another embodiment.

FIG. 19 is a diagram specifically illustrating a difference in effects of the charging unit 20 of embodiment 6 and the charging unit 10 of embodiment 4. The views in the field "upper surface" of FIG. 19 are plan views in which the views in the field "charging unit configuration" in embodiment 4 and embodiment 6 of FIG. 18 are seen from above, and the views in the field "side surface" of FIG. 19 are side views in which the views in the field "charging unit configuration" in embodiment 4 and embodiment 6 of FIG. 18 are seen from side.

As may be seen from FIG. 19 and the performance result of FIG. 18, in embodiment 6, a part of ion diffusion in the upstream direction of the processing airflow is suppressed by an edge portion of the T-shaped ground electrode 22. Due to this, as compared with the case where the ground electrode 12 is disposed parallel to the processing airflow as in embodiment 4, the charging space becomes difficult to spread on the upstream side of the processing airflow, so that charge-up to the periphery of the housing or the like is suppressed. In addition, an electrode area of the T-shaped ground electrode 22 disposed at a certain distance from a front end of the discharge electrode 21 becomes larger than in embodiment 4, and the electric field strength in the space increases, so that the diffusion charge efficiency in a narrow space, that is, the dust collection efficiency is improved.

In embodiment 6, as may be seen from the views of the field "side surface", it is appropriate that the front end of the discharge electrode 21 is disposed on the downstream side of the processing airflow further than the end portion (head part 26) of the ground electrode 22 on the most upstream side.

Ratio of the Width of the Leg Part to the Width of the Head Part of the Ground Electrode in the Second Embodiment FIGS. 20A, 20B, 21A, and 21B are diagrams for explaining a preferable range in a ratio of the width of the leg part 25 to the width of the head part 26 of the T-shaped ground electrode 22 according to the present disclosure.

Figure 20A:
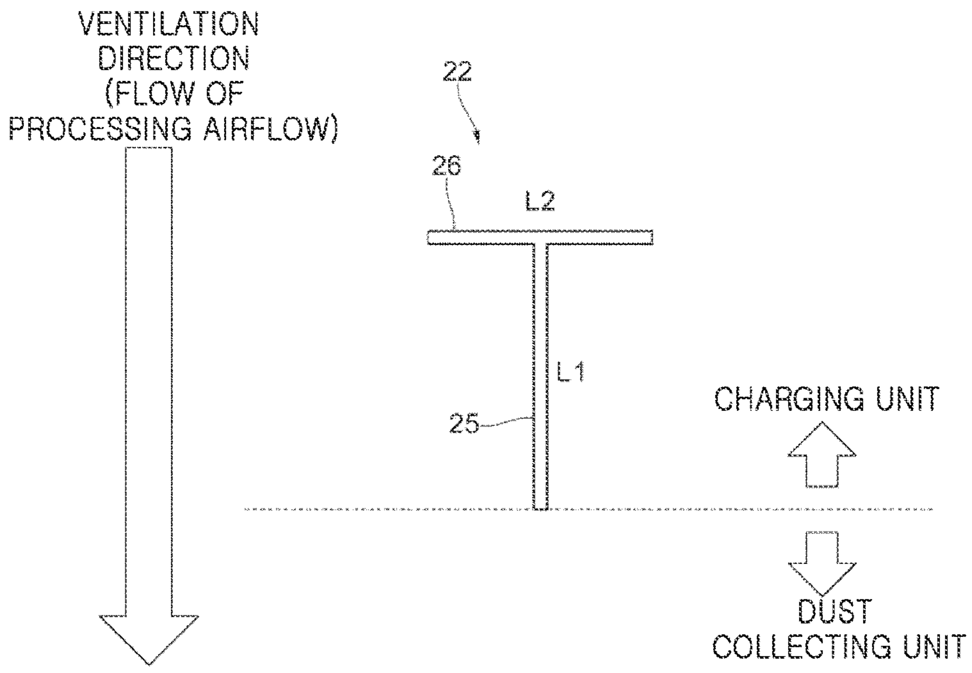
FIGS. 20A and 20B are diagrams for explaining a preferable range in a ratio of a width of a leg part to a width of a head part of a T-shaped ground electrode according to an embodiment of the present disclosure.
Figure 20B:
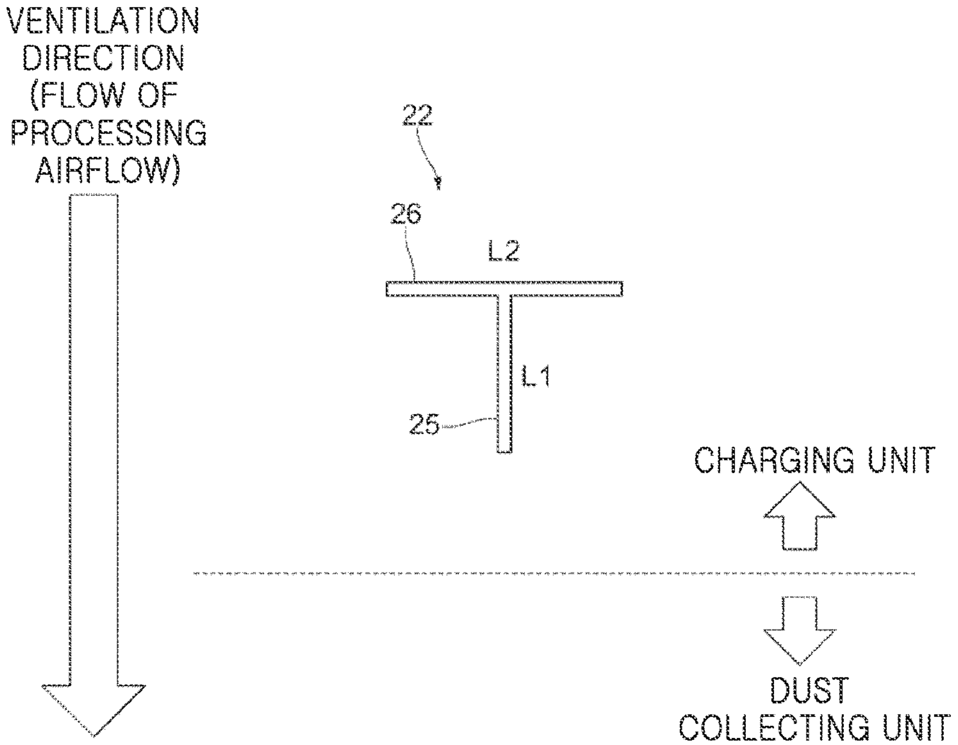

FIGS. 20A and 20B show shapes in which the ground electrode 22 of the field "charging unit configuration" of the embodiment 3 in FIG. 17 or the ground electrode 22 of the field "charging unit configuration" of the embodiment 6 in FIG. 18 is viewed from side. As shown in the drawings, a length of the leg part 25 is denoted by L1, and a length of the head part 26 is denoted by L2. FIG. 20A shows a case where a lower end of the leg part 25 and a lower end of the discharge electrode 21 are at positions corresponding to the direction toward the processing airflow and L1=10 mm. FIG. 20B shows a case where the lower end of the leg part 25 is disposed on the upstream side in the direction toward the processing airflow further than the lower end of the discharge electrode 21 and L1<10 mm (e.g., L1=5 mm). In the drawings, the lower end position of the discharge electrode 21 is indicated by a dotted line indicating a boundary between the charging unit 20 and the dust collecting unit 30.

Figure 21A:
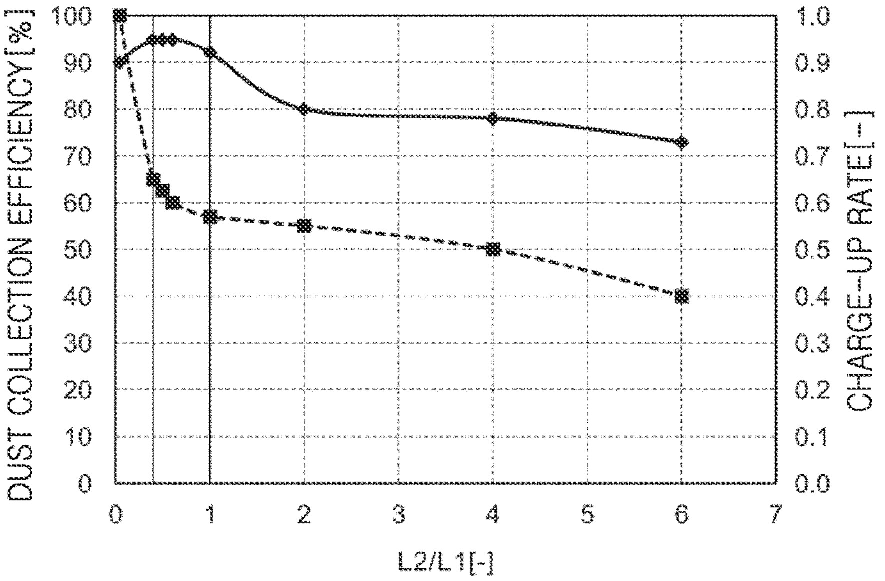
FIGS. 21A and 21B are graphs for explaining the preferable range in the ratio of the width of the leg part to the width of the head part of the T-shaped ground electrode according to an embodiment of the present disclosure.

FIG. 21A is a graph showing changes in dust collection efficiency and charge-up rate when L1=10 mm is made constant and a length of L2 is varied under a condition that the discharge gap is 60 mm, and the positions of the lower end of the leg part 25 of the ground electrode 22 and the lower end of the discharge electrode 21 are aligned in the direction toward the processing airflow.

From the graph showing the change in dust collection efficiency indicated by a solid line, it may be seen that the dust collection efficiency is 90% or more when $L2/L1 \leq 1$. A factor of a decrease in dust collection efficiency when L2/L1 is increased may be, for example, a case in which an ion diffusion distance is insufficient, and thus a charging efficiency is decreased because a distance between an end of the head part 26 and the front end of the discharge electrode 21 is shortened.

From the graph showing the change in charge-up rate indicated by a dotted line, it may be seen that the charge-up rate is 0.7 or less when $0.4 \leq L2/L1$.

Accordingly, it may be seen that a ratio L2/L1 is suitably set to a value satisfying $0.4 \leq L2/L1 \leq 1$.

Figure 21B:
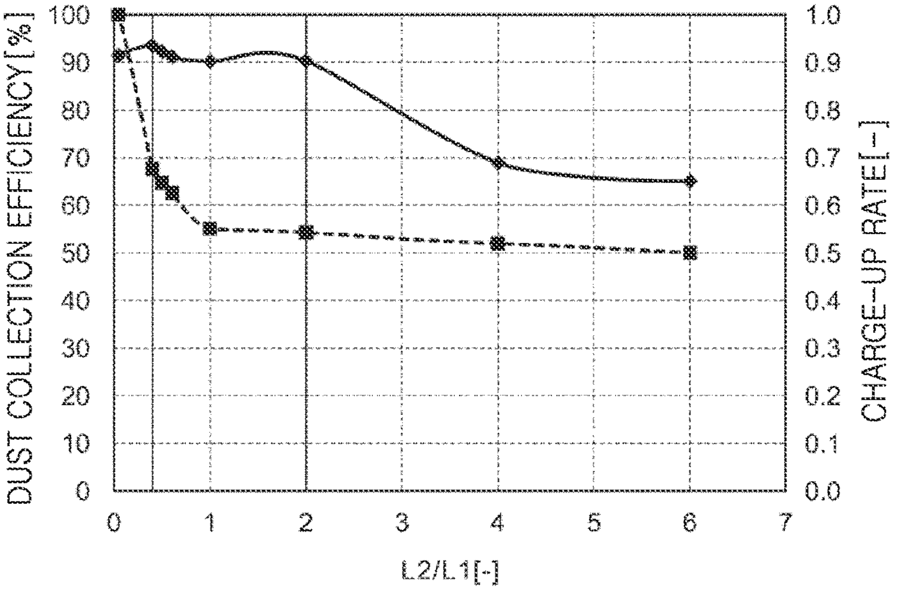

FIG. 21B is a graph showing changes in dust collection efficiency and charge-up rate when L1=5 mm is made constant and the length of L2 is varied under a condition that the discharge gap is 60 mm, and the lower end of the leg part 25 of the ground electrode 22 is disposed on the upstream side in the direction toward the processing airflow further than the lower end of the discharge electrode 21.

From the graph showing the change in dust collection efficiency indicated by a solid line, it may be seen that the dust collection efficiency is 90% or more when $L2/L1 \leq 2$. From the graph showing the change in charge-up rate indicated by a dotted line, it may be seen that the charge-up rate is 0.7 or less when $0.4 \leq L2/L1$.

Accordingly, it may be seen that the ratio L2/L1 is suitably set to a value satisfying $0.4 \leq L2/L1 \leq 2$.

Modified Example 1 of the Second Embodiment

In embodiments 1 to 3, the discharge electrodes 11 and 21 are disposed toward the upstream side of the processing airflow, and in embodiments 4 to 6, the discharge electrodes 11 and 21 are disposed toward the direction of being orthogonal to the processing airflow, but the present disclosure is not limited thereto. In modified example 1, for example, when a dust collecting filter made of fibers is used as the dust collecting unit 30, the discharge electrodes 11 and 21 are disposed on the downstream side of the processing airflow. Alternatively, in modified example 1, for example, the discharge electrodes 11 and 21 may be disposed to be inclined with respect to the direction toward the processing airflow. For example, the discharge electrodes may be disposed at an angle of 45° with respect to the upstream direction of the processing airflow or disposed at an angle of 45° with respect to the downstream direction of the processing airflow.

The disclosed embodiments have been described with reference to the accompanying drawings. It will be apparent that those skilled in the art can make various modifications thereto without changing the technical spirit and essential features of the disclosure. Thus, it should be understood that the embodiments described above are merely for illustrative purposes and not for limitation purposes in all aspects.

The invention claimed is:

1. An electrostatic precipitator comprising:

a charging unit having a discharge electrode that includes a plurality of electrically conductive fibers and provided to generate and diffuse ions by a discharge, a power feeding member provided to feed a high voltage to the plurality of electrically conductive fibers and a caulking part protruding toward an upstream side of a processing airflow from the power feeding member and being connected to plurality of electrically conductive fibers;

a ground electrode, at a ground potential, to attract the ions generated and diffused by the discharge electrode to charge suspended fine particles in the processing airflow by the ions, the ground electrode being among a plurality of ground electrodes and the discharge electrode being between the plurality of ground electrodes in the processing airflow; and a dust collecting unit to collect the suspended fine particles charged by the charging unit, wherein the plurality of electrically conductive fibers of the discharge electrode is along a downstream side of the processing airflow further than an end portion of the ground electrode along the upstream side of the processing airflow, wherein a rear end of the plurality of electrically conductive fibers of the discharge electrode is caulked to the caulking part, and wherein a front end of the plurality of electrically conductive fibers of the discharge electrode is spread out in a brush shape and faces the upstream side of the processing airflow.

2. The electrostatic precipitator according to claim 1, wherein the plurality of electrically conductive fibers of the discharge electrode is formed to generate ions toward the upstream side of the processing airflow.

3. The electrostatic precipitator according to claim 1, wherein the ground electrode is disposed at a position to attract the ions generated and diffused by the discharge electrode along a direction of crossing the processing airflow.

4. The electrostatic precipitator according to claim 3, wherein the discharge electrode is installed at a center between two of adjacent ground electrodes among the plurality of ground electrodes and disposed such that a separation distance from the ground electrode along a direction of being orthogonal to the processing airflow is 20 mm or more and 100 mm or less.

5. The electrostatic precipitator according to claim 1, wherein the ground electrode is formed of a plate-shaped electrically conductive member.

6. The electrostatic precipitator according to claim 5, wherein the ground electrode is disposed such that an arrangement direction of the ground electrode with respect to the discharge electrode is orthogonal to the processing airflow and the plate-shaped electrically conductive member is parallel to the processing airflow.

7. The electrostatic precipitator according to claim 5, wherein the ground electrode is disposed such that an arrangement direction of the ground electrode with respect to the discharge electrode is orthogonal to the processing airflow and the plate-shaped electrically conductive member crosses the processing airflow.

8. The electrostatic precipitator according to claim 5, wherein the ground electrode comprises a first electrode part of a plate shape disposed along a direction of being parallel to the processing airflow, and a second electrode part of a plate shape disposed along a direction of crossing the processing airflow.

9. The electrostatic precipitator according to claim 8, wherein an end portion of the first electrode part located on the upstream side of the processing airflow and a central portion of the second electrode part are joined such that the first electrode part and the second electrode part of the ground electrode form a T-shape.

10. The electrostatic precipitator according to claim 9, wherein when a length of the first electrode part of the ground electrode along the direction of being parallel to the processing airflow is denoted by L1 and a length of the second electrode part along the direction of crossing the processing airflow is denoted by L2, a ratio L2/L1 is set to a value satisfying $0.4 \le L2/L1 \le 2$.

11. The electrostatic precipitator according to claim 8, wherein the discharge electrode is disposed on the downstream side of the processing airflow further than an end portion of the first electrode part located on the upstream side of the processing airflow.

12. The electrostatic precipitator according to claim 1, further comprising:

a high voltage power supply provided to apply a high voltage between the discharge electrode and the ground electrode, wherein the high voltage power supply applies a DC high voltage having a positive polarity or a negative polarity between the discharge electrode and the ground electrode.

13. The electrostatic precipitator according to claim 1, further comprising a high voltage power supply provided to apply a high voltage between the discharge electrode and the ground electrode, wherein the high voltage power supply applies an AC high voltage having a positive polarity or a negative polarity between the discharge electrode and the ground electrode.

14. The electrostatic precipitator according to claim 1, wherein the dust collecting unit comprises:

a first plate-shaped dust collecting electrode in which a surface thereof is coated with a film of an insulating material, and a second plate-shaped dust collecting electrode having an electrical conductivity, where the first plate-shaped dust collecting electrode and the second plate-shaped dust collecting electrode are alternately stacked.

15. An electrostatic charger comprising:

a discharge electrode having a plurality of electrically conductive fibers and provided to generate and diffuse ions by a discharge, a power feeding member provided to feed a high voltage to the plurality of electrically conductive fibers and a caulking part protruding toward an upstream side of a processing airflow from the power feeding member and being connected to plurality of electrically conductive fibers; and a ground electrode, at a ground potential, to attract the ions generated and diffused by the discharge electrode to charge suspended fine particles in the processing airflow by the ions, the ground electrode being among a plurality of ground electrodes and the discharge electrode being between the plurality of ground electrodes in the processing airflow, wherein the plurality of electrically conductive fibers of the discharge electrode is along a downstream side of the processing airflow further than an end portion of the ground electrode along the upstream side of the processing airflow, wherein a rear end of the plurality of electrically conductive fibers of the discharge electrode is caulked to the caulking part, and wherein a front end of the plurality of electrically conductive fibers of the discharge electrode is spread out in a brush shape and faces the upstream side of the processing airflow.

16. The electrostatic charger according to claim 15, wherein the ground electrode is formed of a plate-shaped electrically conductive member.

17. The electrostatic charger according to claim 16, wherein the ground electrode comprises a first electrode part of a plate shape disposed along a direction of being parallel to the processing airflow, and a second electrode part of a plate shape disposed along a direction of crossing the processing airflow.

18. The electrostatic charger according to claim 17, wherein an end portion of the first electrode part located on the upstream side of the processing airflow and a central portion of the second electrode part are joined such that the first electrode part and the second electrode part of the ground electrode form a T-shape.

19. The electrostatic charger according to claim 18, wherein when a length of the first electrode part of the ground electrode along the direction of being parallel to the processing airflow is denoted by L1 and a length of the second electrode part along the direction of crossing the processing airflow is denoted by L2, a ratio L2/L1 is set to a value satisfying $0.4 \le L2/L1 \le 2$.

* * * * *